(12) United States Patent
Enta

(10) Patent No.: US 10,371,921 B2
(45) Date of Patent: Aug. 6, 2019

(54) LENS DRIVE DEVICE, CAMERA MODULE, AND CAMERA MOUNTING DEVICE

(71) Applicant: Yohei Enta, Tokyo (JP)

(72) Inventor: Yohei Enta, Tokyo (JP)

(73) Assignee: MITSUMI ELECTRIC CO, LTD., Tokyo (JP)

( * ) Notice: Subject to any disclaimer, the term of this patent is extended or adjusted under 35 U.S.C. 154(b) by 28 days.

(21) Appl. No.: 15/738,243

(22) PCT Filed: Jun. 15, 2016

(86) PCT No.: PCT/JP2016/002889
§ 371 (c)(1),
(2) Date: Dec. 20, 2017

(87) PCT Pub. No.: WO2016/208156
PCT Pub. Date: Dec. 29, 2016

(65) Prior Publication Data
US 2018/0188474 A1    Jul. 5, 2018

(30) Foreign Application Priority Data

Jun. 25, 2015 (JP) ................................. 2015-127686
Mar. 24, 2016 (JP) ................................. 2016-060058

(51) Int. Cl.
*G02B 7/04* (2006.01)
*G03B 5/02* (2006.01)
(Continued)

(52) U.S. Cl.
CPC ................. *G02B 7/04* (2013.01); *G02B 7/08* (2013.01); *G02B 27/646* (2013.01); *G03B 5/02* (2013.01);
(Continued)

(58) Field of Classification Search
CPC .......... G02B 7/04; G02B 7/08; G02B 27/646; H04N 5/225; H04N 5/2253; G03B 5/02
See application file for complete search history.

(56) References Cited

U.S. PATENT DOCUMENTS

2013/0016427 A1    1/2013   Sugawara

FOREIGN PATENT DOCUMENTS

JP    2013-024938 A    2/2013
JP    2014-010287 A    1/2014
(Continued)

OTHER PUBLICATIONS

International Search Report from International Application No. PCT/JP2016/002889 dated Sep. 13, 2016.

*Primary Examiner* — Jack Dinh
(74) *Attorney, Agent, or Firm* — Brundidge & Stanger, P.C.

(57) ABSTRACT

Provided is a lens drive device for which, before the device itself is assembled, the operation by an OIS voice coil motor in a shake correcting actuator is confirmed, so as to reduce the production costs in case of an operation defect and to achieve good production. The device comprises: a mobile body configured so that a magnet is disposed in a frame-shaped retaining member in which an imaging module is installed; a fixed body which has a base member and which is configured so that a coil is disposed in the base member; a support part that tiltably supports the mobile body relative to the fixed body; and a main substrate to which the fixed body is fixed. The fixed body includes a coil substrate having a terminal to which the coil is connected, and the coil is connected to a circuit of the main substrate via the terminal.

9 Claims, 16 Drawing Sheets

(51) Int. Cl.
*H04N 5/225* (2006.01)
*G02B 7/08* (2006.01)
*G02B 27/64* (2006.01)

(52) U.S. Cl.
CPC ........... *H04N 5/225* (2013.01); *H04N 5/2253* (2013.01); *G03B 2205/0069* (2013.01)

(56) References Cited

FOREIGN PATENT DOCUMENTS

| | | |
|---|---|---|
| JP | 2015-069004 A | 4/2015 |
| WO | 2016/103687 A1 | 6/2016 |

LENS DRIVE DEVICE, CAMERA MODULE, AND CAMERA MOUNTING DEVICE

TECHNICAL FIELD

The present invention relates to a lens driving device, camera module, and camera-mounted device that include a shake-correcting function.

BACKGROUND ART

In general, a small-sized camera module is mounted in mobile terminals, such as smartphones. Such a module often has an auto-focusing function for automatically focusing at the time of capturing a subject and a shake-correcting function (OIS: Optical Image Stabilization) for reducing irregularities of an image by correcting shake (vibration) caused at the time of capturing an image.

As a shake-correcting method, a module tilt method is known in which an imaging module is integrally tilted (see e.g. Patent Literature (hereinafter referred to as "PTL") 1). The imaging module is a module having a lens part and an imaging device (for example, a charge coupled device (CCD)), which may be provided with an auto-focusing actuator.

Hereinafter, the auto-focusing actuator is referred to as "AF actuator," and a shake-correcting actuator is referred to as "OIS actuator."

FIG. 1 is an external view illustrating an exemplary camera module of a traditional module tilt type. FIG. 2 is an exploded perspective view illustrating the exemplary camera module of a traditional module tilt type.

As illustrated in FIGS. 1 and 2, camera module 2 of a traditional module tilt type includes fixing part 21, movable part 22, elastic supporting part 23, imaging module 24, and shake detection part 25. The OIS actuator is composed of fixing part 21, movable part 22, and elastic supporting part 23.

Fixing part 21 includes base member 211, coil part 212, and OIS print wiring board 213. Coil part 212 is disposed on base member 211. OIS print wiring board 213 feeds power to coil part 212, and outputs a detection signal of shake detection part 25 to a control part.

Movable part 22 includes yoke 221, magnet part 222, top plate 223, and module guide 224. Yoke 221 and magnet part 222 are disposed in respective housing sections formed in top plate 223. Module guide 224 is fixed to top plate 223. Imaging module 24 is fixedly disposed in a space sandwiched between a pair of module guides 224.

Elastic supporting part 23 has a biaxial gimbal mechanism, and movable part 22 (top plate 223) is fixed to an outer gimbal. Elastic supporting part 23 is disposed at an approximate center of base member 211 in a floating fashion, and fixed by stopper 231. Elastic supporting part 23 supports movable part 22 such that movable part 22 can rotationally sway around the X axis and the Y axis orthogonal to the optical axis (Z axis), that is, elastic supporting part 23 supports movable part 22 such that movable part 22 can be tilted.

Shake detection part 25 is composed of a gyro sensor that detects the angular velocity of imaging module 24, for example. Shake detection part 25 is fixed to a side surface of module guide 224 of movable part 22. The detection signal of shake detection part 25 is output to the control part through OIS print wiring board 213 that constitutes fixing part 21.

An OIS voice coil motor (VCM) is composed of coil part 212 and magnet part 222. That is, when a current flows through coil part 212, a Lorentz force is generated at coil part 212 by interaction between the magnetic field of magnet part 222 and a current flowing through coil part 212 (Fleming's left hand rule). Since coil part 212 is fixed, a reactive force is exerted on magnet part 222. This reactive force is the driving force of the OIS voice coil motor. Movable part 22 rotationally sways until the driving force of the OIS voice coil motor and the restoration force (returning force) of elastic supporting part 23 become equivalent to each other. In this manner, the shift of the optical axis due to shake is corrected, and the orientation of the optical axis is kept at an orientation.

In the meantime, in the above-mentioned configuration, OIS print wiring board 213 may be a rigid flexible printed wiring board (or rigid flexible printed circuit (hereinafter collectively referred to as "rigid FPC")). Using the rigid FPC in camera module 2 makes it possible to mount, on a rigid portion, an OIS driver and the like configured to supply electricity to coil part 212 so as to drive the OIS voice coil motor.

CITATION LIST

Patent Literature

PTL 1
Japanese Patent Application Laid-Open No. 2014-10287

SUMMARY OF INVENTION

Technical Problem

As described in PTL 1, in camera modules of a traditional module tilt type, OIS print wiring board 213 for power supply to coil part 212 is attached, as a part of fixing part 21, to base member 211 on which coil part 212 is disposed.

Therefore, it is only after assembly of camera module 2 that electricity can be supplied to coil part 212 to move movable part 22 so as to check operations of an imaging module that are driven by the OIS voice coil motor, such as a tilt angle formed in an actual tilt operation of the imaging module or the like.

For this reason, an assembled camera module itself is made unusable if movable part 22 cannot be tilted at a desired angle due to a malfunction of the OIS voice coil motor when electricity is supplied to coil part 212. Moreover, in an attempt to improve the productivity in assembly, shake detection part 25, such as a gyro sensor or the like, may be mounted on OIS print wiring board 213 before base member 211 is attached to OIS print wiring board 213. In such a case, when there is a malfunction of the OIS voice coil motor, functionally-satisfactory and expensive shake detection part 25, such as a gyro sensor or the like, is together made unusable, so that the production cost of the camera module as a whole increases. Thus, it has been desired to reduce production cost as much as possible.

In particular, in a configuration in which OIS print wiring board 213 is a rigid FPC, the rigid FPC itself is also made unusable, and besides, an OIS IC mounted on the rigid FPC is also made unusable, which causes a further increase in production cost.

An object of the present invention is to provide a lens driving device, a camera module, and a camera-mounted device for which movements of a shake-correcting actuator that are driven by an OIS voice coil motor are checked before assembly of the lens driving device itself, so that a production cost of when a malfunction of the shake-correcting actuator is found is reduced and preferable production can be achieved.

Solution to Problem

A lens driving device according to one aspect of the present invention is configured to correct shake by tilting an imaging module with a driving force of a voice coil motor including a coil part and a magnet part, the imaging module including a lens part and an imaging device, the lens driving device including: a movable part including a frame-shaped holding member on which the imaging module is to be placed, wherein the magnet part is disposed to the frame-shaped holding member; a fixing part including a base member, wherein the coil part is disposed to the base member; a supporting part to be disposed to the base member, and configured to support the movable part such that the movable part is tiltable with respect to the fixing part; and a main board including a circuit that enables shake correction by driving the voice coil motor by electric supply to the coil part, the fixing part being fixed to the main board. In the lens driving device, the fixing part includes a coil board including a terminal part to which the coil part is connected, and the coil part is configured to be connected to the circuit of the main board via the terminal part of the coil board.

A camera module according to one aspect of the present invention is configured to include: the above lens driving device; the imaging module including the lens part and the imaging device, the imaging module being configured to be bonded to the frame-shaped holding member; and a shake detection part configured to detect shake of the imaging module.

A camera-mounted device according to one aspect of the present invention is configured to be an information device or a transporting device, and to include the above camera module.

Advantageous Effects of Invention

According to the present invention, movements of a shake-correcting actuator that are driven by an OIS voice coil motor are checked before assembly of a lens driving device itself, so that a production cost of when a malfunction of the shake-correcting actuator is found is reduced and preferable production can be achieved.

DESCRIPTION OF EMBODIMENTS

In the following, an embodiment of the present invention is described in detail with reference to the drawings.

Figure 1:
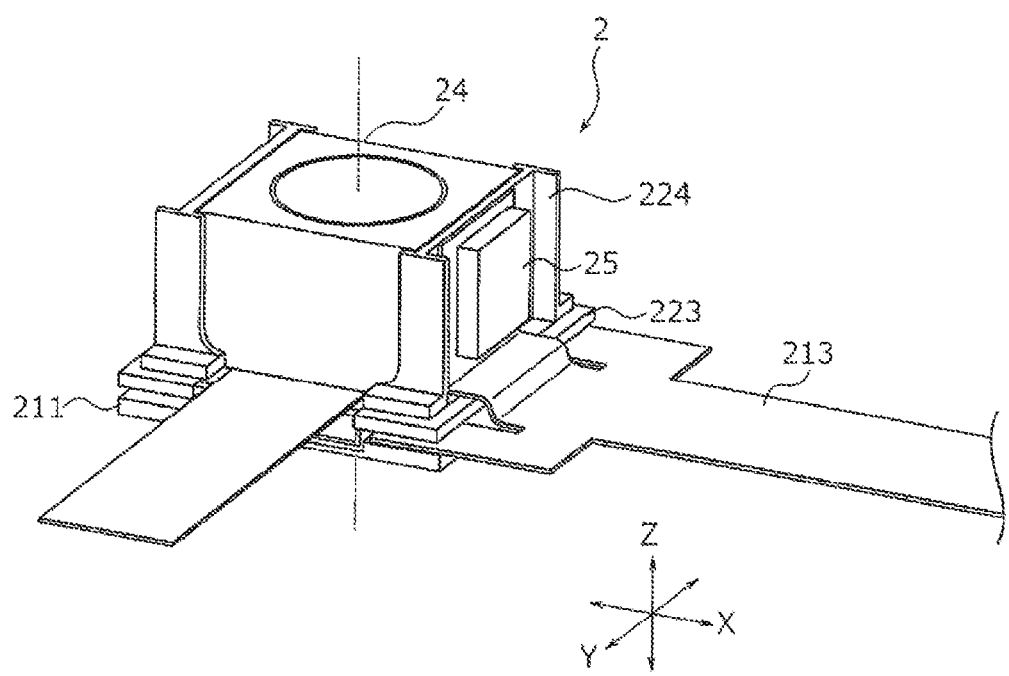
FIG. 1 is an external view illustrating an exemplary camera module of a traditional module tilt type.
Figure 2:
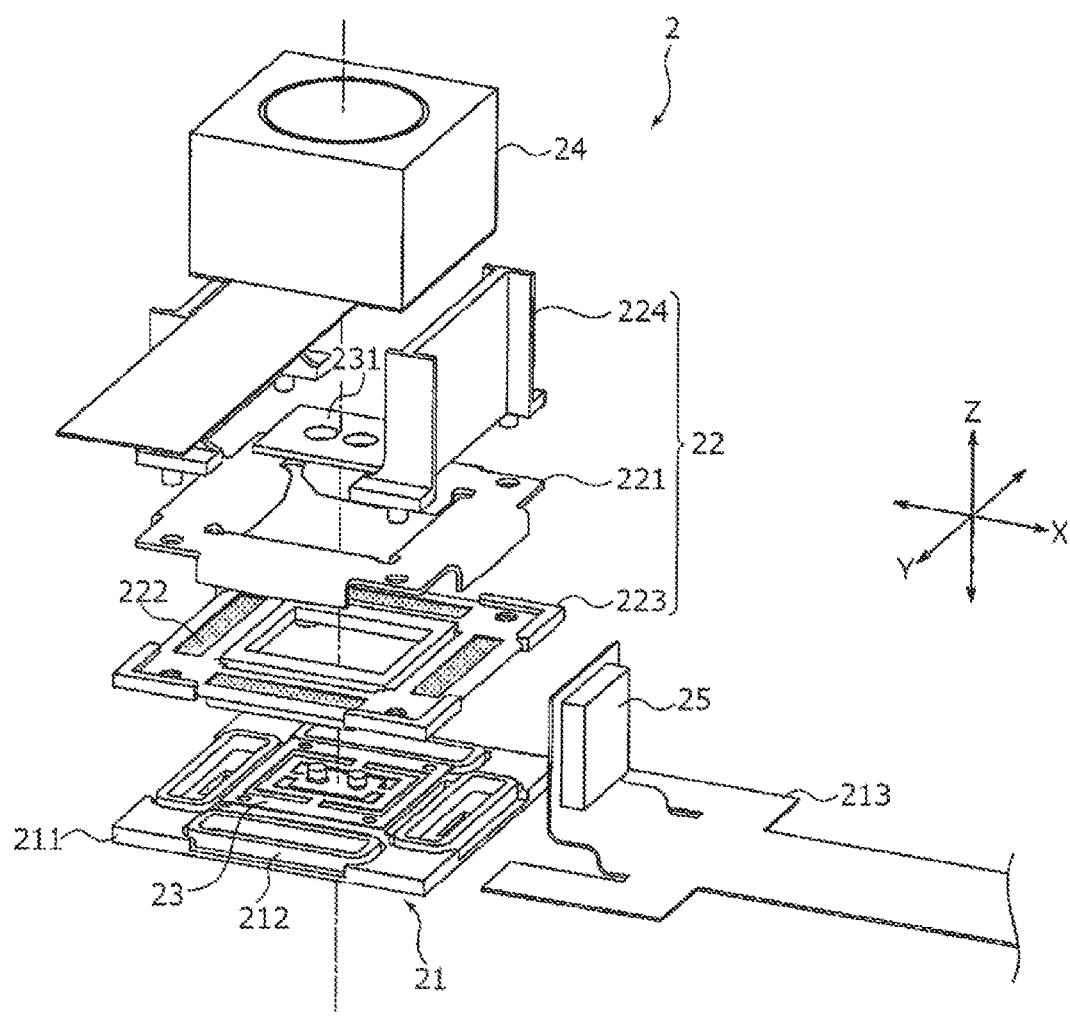
FIG. 2 is an exploded perspective view illustrating the exemplary camera module of a traditional module tilt type.
Figure 3A:
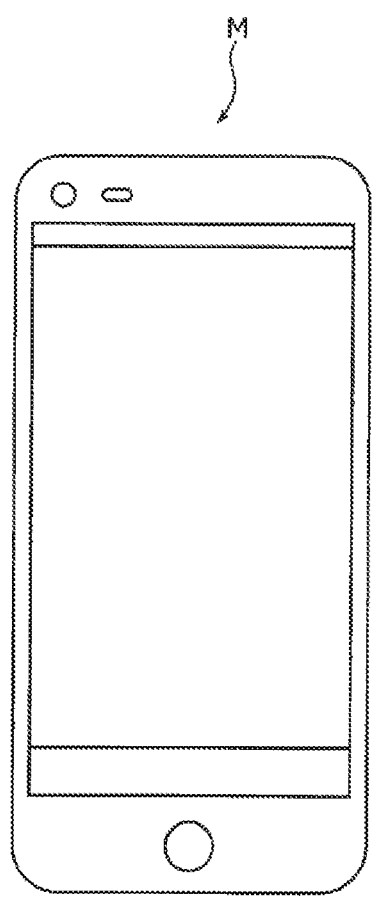
FIGS. 3A and 3B illustrate a smartphone in which a camera module according to an embodiment of the present invention is mounted.
Figure 3B:
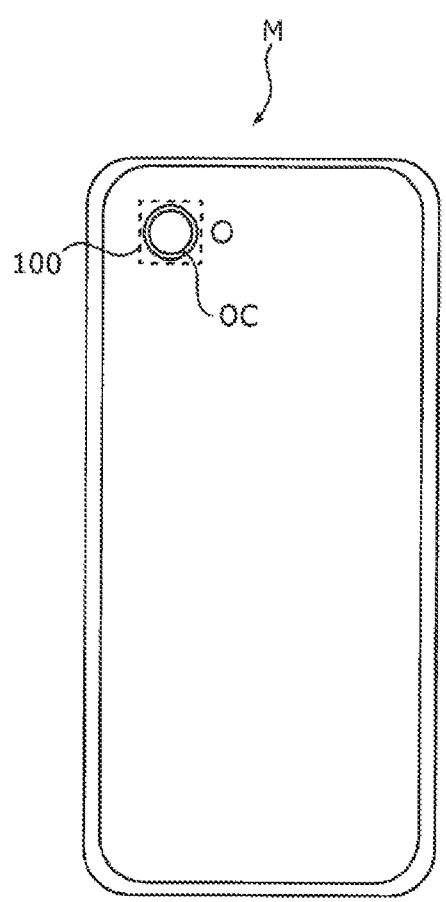

FIGS. 3A and 3B illustrate smartphone M in which camera module 100 according to an embodiment of the present invention is mounted. FIG. 3A is a front view of smartphone M, and FIG. 3B is a rear view of smartphone M.

For example, smartphone M is provided with camera module 100 as a back side camera OC. Camera module 100 has an auto-focusing function and a shake-correcting function, and can capture an image without image blurring by automatically performing focusing at the time of capturing a subject and by correcting shake (vibration) caused at the time of capturing an image. The shake-correcting function of camera module 100 is of a module tilt type. The module tilt type is advantageous in that no deformation is caused at four corners of the screen.

Figure 4:
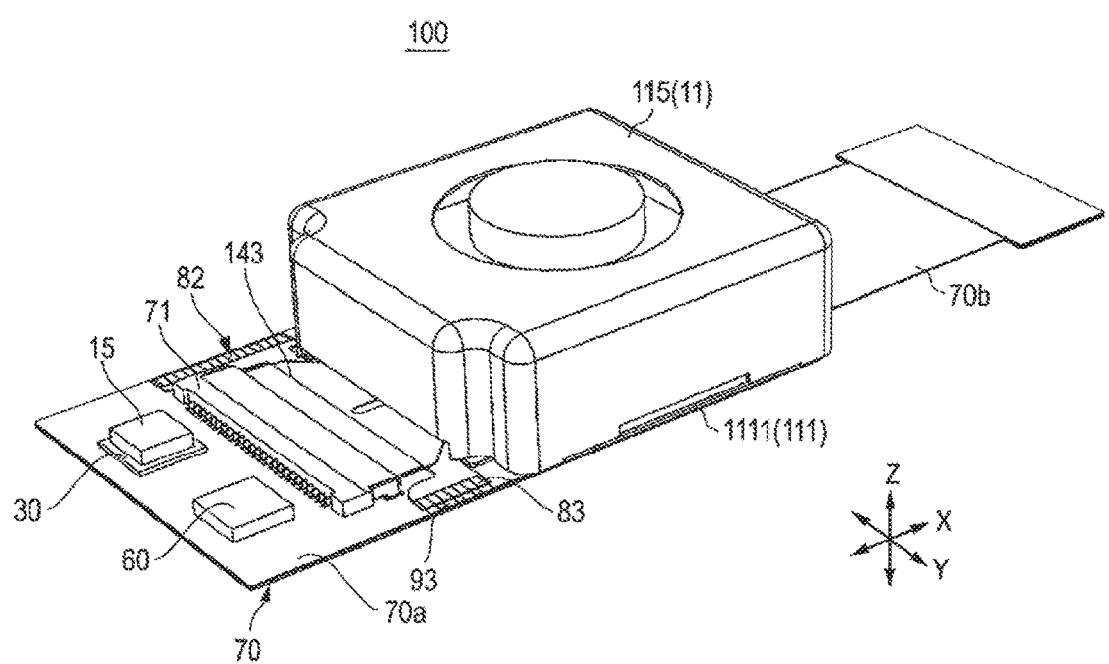
FIG. 4 is a perspective view of an external appearance of the camera module.
Figure 5:
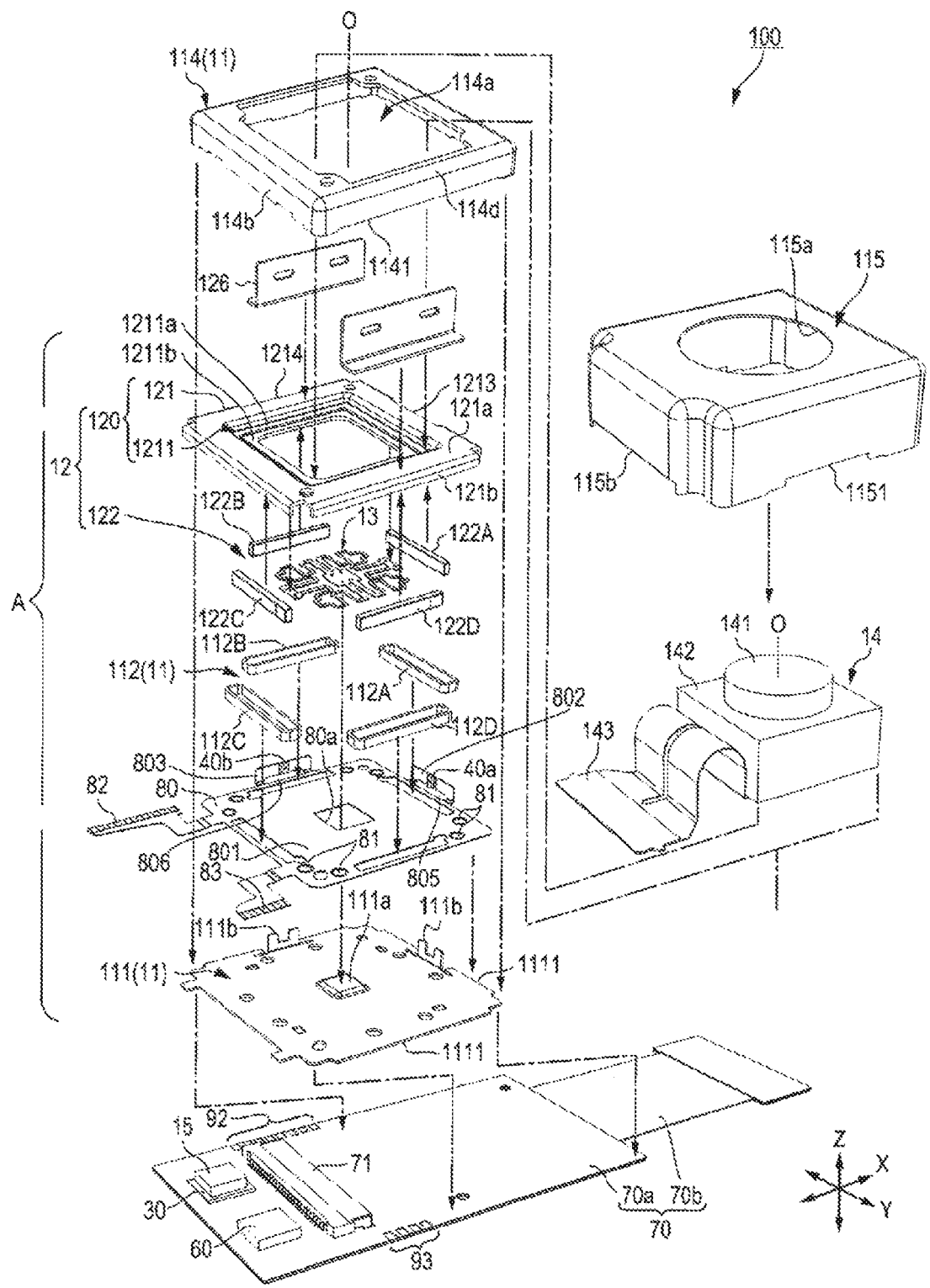
FIG. 5 is an exploded perspective view of the camera module.
Figure 6:
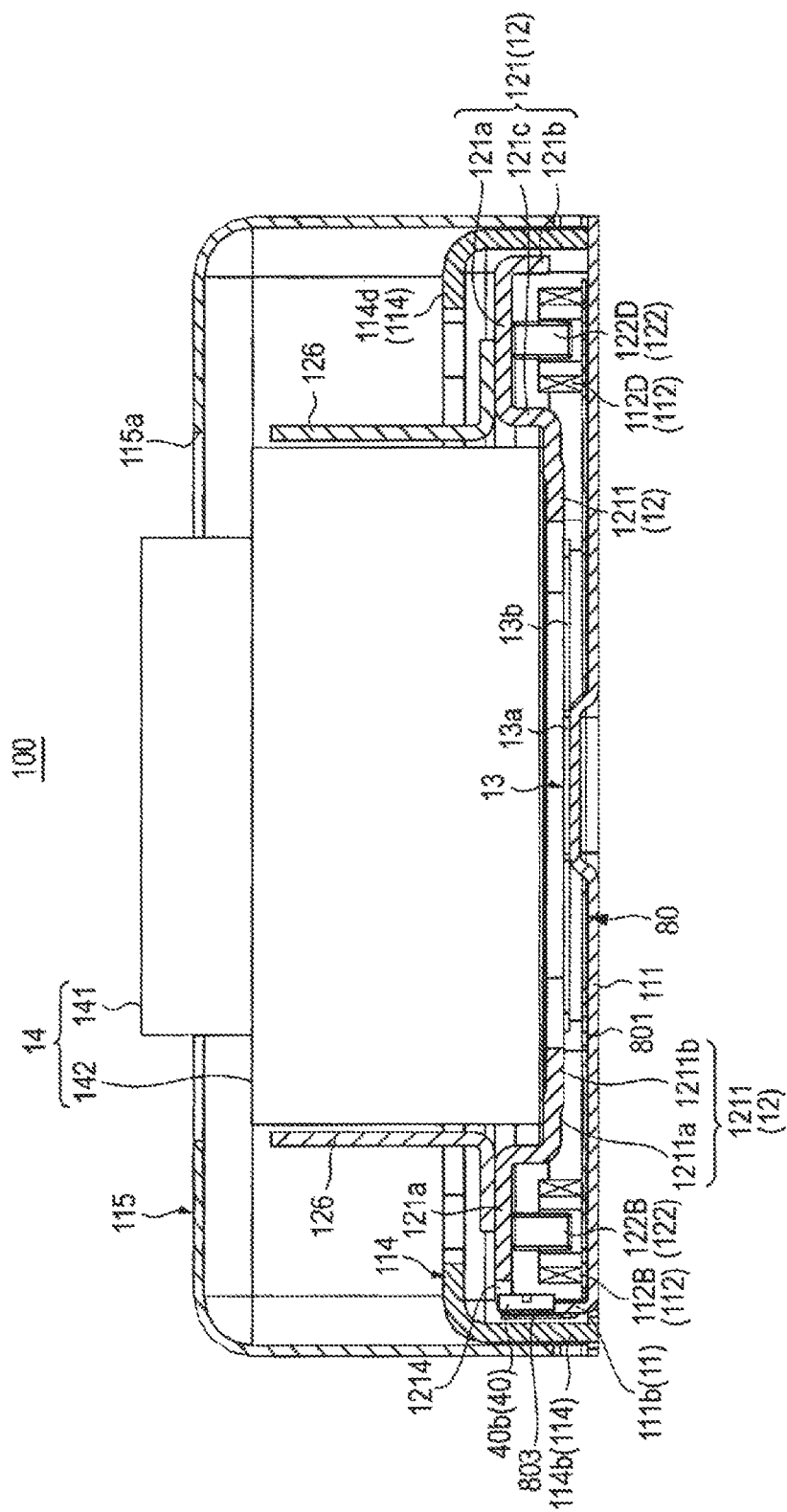
FIG. 6 is a sectional view taken along the Y direction of the camera module.
Figure 7:
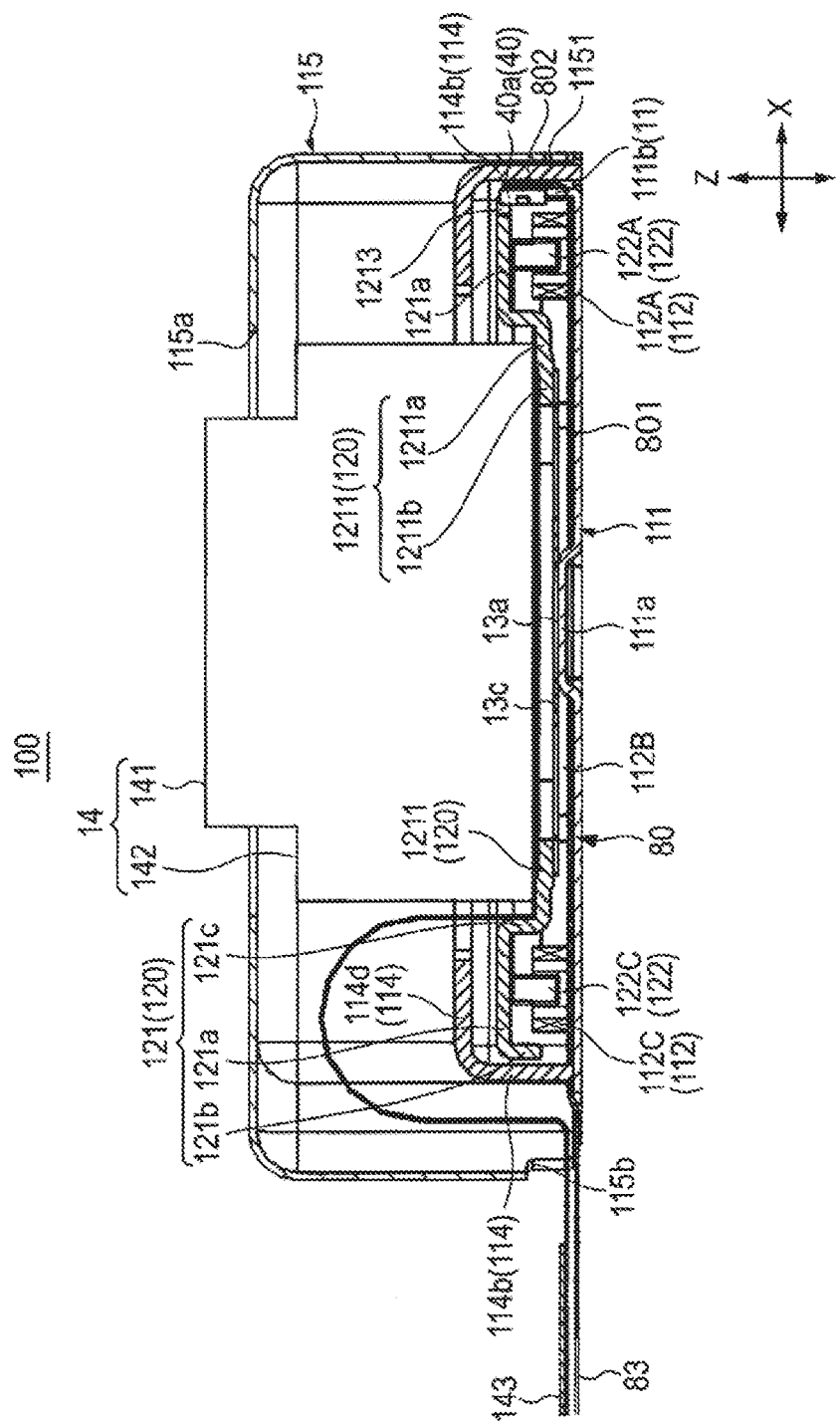
FIG. 7 is a sectional view taken along the X direction of the camera module.

FIG. 4 is a perspective view of an external appearance of camera module 100. FIG. 5 is an exploded perspective view of camera module 100. FIG. 6 is a sectional view of camera module 100 along the Y direction. FIG. 7 is a sectional view of camera module 100 along the X direction. FIGS. 6 and 7 are the sectional views of OIS actuator A of camera module 100, and, in particular, each illustrate a magnetic circuit part of the voice coil motor.

As illustrated in FIGS. 4 to 7, descriptions will here be made with an orthogonal coordinate system (X, Y, Z). Camera module 100 is mounted such that the vertical direction (or horizontal direction) is the X direction, the horizontal direction (or vertical direction) is the Y direction, and the front-rear direction is the Z direction (optical axis direction) at the time of actually capturing an image with smartphone M.

As illustrated in FIGS. 4 to 7, camera module 100 includes fixing part 11, movable part 12, elastic supporting part 13, imaging module (driven part) 14, shake detection part (gyro sensor) 15, intermediary substrate 30, displacement detection part (tilt detection part) 40, driver IC 60, rigid flexible printed wiring board (rigid FPC) 70, coil board 80 used for inspection, and the like. OIS actuator A is composed of fixing part 11, movable part 12, elastic supporting part 13, and coil board 80 used for inspection. A lens driving device is configured to further include rigid FPC 70 as well as the components of OIS actuator A. In OIS actuator A, shake correction is implemented by allowing movable part 12 to move with use of the driving force of an OIS voice coil motor including coil part 112 and magnet part 122.

Fixing part 11 is fixed to rigid FPC 70, and is immovably fixed together with rigid FPC 70 in smartphone M when mounted in smartphone M. Fixing part 11 supports movable part 12 via elastic supporting part 13 such that movable part 12 is movable. Fixing part 11 includes base member 111, coil part 112, skirt member (cover member) 114, main body cover member (hereinafter referred to as "cover member") 115, and coil board 80.

As mentioned above, rigid FPC 70 includes rigid portion 70a formed of a hard material, such as glass epoxy, and, at a part to be used for integration of rigid FPC 70 and/or to be repeatedly bent, a bending material (polyimide) used for a flexible printed circuit (FPC) is used (hereinafter referred to as "flexible portion 70b"). In this embodiment, rigid FPC 70 is formed as a substrate that is composed of a glass epoxy substrate attached to the FPC, and that has the same bendability as the FPC while having a greater rigidity than the FPC.

Base member 111 is disposed on rigid portion 70a. Driver IC 60, shake detection part 15 which is to be mounted on rigid FPC 70 via intermediary substrate 30, AF driving connector 71, and connecting terminal parts 92 and 93 are mounted on rigid portion 70a at respective positions spaced apart from base member 111 and connected to a circuit which is to be connected to rigid portion 70a. Flexible portion 70b includes a connector to be connected to the main body side of camera module 100, and a power source line (not illustrated) to be connected to rigid portion 70a. Flexible portion 70b is connected to rigid portion 70a, and the power source line is electrically connected to power supply pads 81 via rigid FPC 70.

Driver IC (driving control part) 60 supplies electricity to coil part 112 by control of a control part (not illustrated) to move movable part 12, that is, moves imaging module 14 to be attached to movable part 12 together with movable part 12, so that tilt of imaging module 14 is corrected.

Shake detection part 15 detects shake (motion) of electronic equipment, such as a smartphone, in which camera module 100 is mounted. Shake detection part 15 is composed of a gyro sensor which is configured to detect the angular velocity of, for example, camera module 100 (electronic equipment, such as a smartphone, in which camera module 100 is mounted). Shake detection part 15 detects shake at least in the biaxial (X and Y) directions orthogonal to optical axis O. In this embodiment, shake in the directions of three of X-, Y-, and Z-axes is detectable.

A detection signal of shake detection part 15 is output to the control part (not illustrated) via intermediary substrate 30 and rigid portion 70a. The control part (not illustrated) controls the current for energization of coil part 112 via driver IC 60 based on this detection signal and on the detection signal obtained by displacement detection part 40 (Hall elements 40a and 40b). In the meanwhile, the function of the control part (not illustrated) may be performed by the driver IC, and the control part may be mounted on rigid portion 70a. In addition, a control part mounted in smartphone M may be utilized via rigid FPC 70. A shake angle is detected by detection of tilt of camera module 100 itself by shake detection part 15, a detection value (Hall output value) corresponding to this shake angle is detected by displacement detection part 40, and based on this detection value, the current for energization to coil part 112 is controlled by means of driver IC 60 to move movable part 12, so that shake correction is performed.

Base member 111 is a member formed of a metal material in a substantially rectangular shape, and is disposed on rigid portion 70a. By forming base member 111 of a metal material, the strength of base member 111 is made greater in comparison with a case where base member 111 is formed of a resin. Thus, the thickness of base member 111 can be reduced, and accordingly, the height reduction of camera module 100 can be achieved.

Base member 111 includes, at the center thereof, protruding portion 111a having a truncated pyramid shape for fixing elastic supporting part 13. In addition, base member 111 includes, at the middle portions of four sides constituting the peripheral edge of base member 111, protruding side portions 1111 for positioning cover member 115 and skirt member 114 during fixation thereof. Protruding side portions 1111 are respectively engaged with cutouts 1141 and 1151 of skirt member 114 and cover member 115 when skirt member 114 and cover member 115 are attached to base member 111. In particular, by virtue of engagement of cutout 1141 with protruding side portion 1111, skirt member 114 is fit at the outside of the peripheral edge of base member 111 to be fixedly positioned. As for cover member 115, cutout 1151 is engaged with protruding side portion 1111 of base member 111, and cover member 115 is fit at the outside of the outer peripheral surface of skirt member 114. In this way, cover member 115 are also positioned by means of protruding side portions 1111 of base member 111.

In base member 111, pieces 111b and 111b respectively having recessed (U-shaped) cutouts 111c and 111c are provided upright at the middle portions of two sides, which are orthogonal to each other, of four sides constituting the peripheral edge of base member 111. Displacement detection part 40 is disposed in these recesses.

To be more specific, pieces 111b and 111b are provided upright respectively at one of two sides of the peripheral edge of base member 111 that extend in the X direction and at one of two sides of the peripheral edge of base member 111 that extend in the Y direction. Displacement detection part 40 is brought into contact with the bases of cutouts 111c and 111c of pieces 111b and 111b (see FIGS. 6 and 7). For example, piece 111b is formed from a main body portion of base member 111 by cutting the main body portion such that the cut portion is stood upright from the main body portion.

Figure 8:
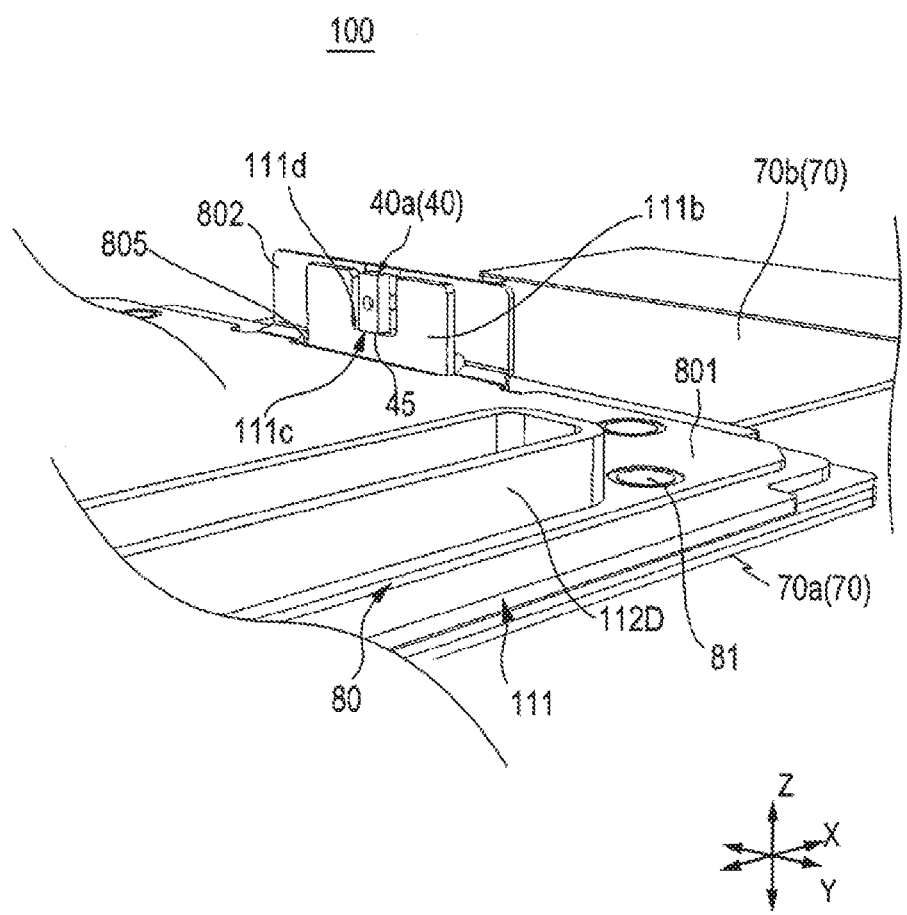
FIG. 8 is an explanatory perspective view illustrating a state of attachment of a displacement detection part in the camera module.

FIG. 8 is an explanatory perspective view illustrating a state of attachment of displacement detection part 40. Note that, FIG. 8 illustrates the state of attachment of Hall element 40a that is displacement detection part 40 in fixing part 11, while illustration of movable part 12 and imaging module 14 is omitted for convenience.

As illustrated in FIG. 8, bottom surface 45 of displacement detection part 40 (Hall element 40a) in cutout 111c is brought into contact with the base of cutout 111c. In this way, displacement detection part 40 (Hall element 40a) is positioned in the Z direction. Note that, Hall element 40b that is another Hall element serving as displacement detection part 40 also is brought into contact with the base of cutout 111c so as to be positioned in the same manner as Hall element 40a.

As illustrated in FIGS. 4 to 8, coil board 80 is disposed on base member 111. Coil board 80 is a board including a circuit connected to the input and output terminals of electronic components used for achieving the OIS function in actuator A.

Coil board 80 is a rectangular flexible printed circuit board including the wiring connected to coil part 112 and displacement detection part 40. Note that, the wiring of coil board 80 forms a wiring pattern having the power source lines of coil part 112 and displacement detection part 40, and a signal line of displacement detection part 40. In this embodiment, coil board 80 carries tilt coils 112A to 112D as coil part 112, two Hall elements 40a and 40b as displacement detection part 40, and connecting terminals 82 and 83 composed of a total of 12 pins connected to tilt coils 112A to 112D and Hall elements 40a and 40b. That is, the wiring pattern of coil board 80 includes the wiring connecting tilt coils 112A to 112D, Hall elements 40a and 40b, and connecting terminals 82 and 83 to each other. Connecting terminals 82 and 83 are formed at portions of coil board 80 extending laterally outward from parts of outer periphery of the rectangular portion (main board portion 801). The terminals of 12 pins include input and output terminals of each pair of opposite tilt coils among tilt coils 112A to 112D, which amount to a total of four pins, and include a total of eight pins of Hall elements 40a and 40b.

Coil board 80 includes main board portion 801 which is a rectangular frame portion, and Hall-element attachment portions 802 and 803. Opening 80a in which protruding portion 111a of base member 111 is to be inserted is formed in the central portion of rectangular main board portion 801. Protruding portion 111a is disposed to protrude upward from coil board 80 through this opening 80a. Power supply pads 81 to be connected to coil part 112 are provided on main board portion 801 of coil board 80 at the periphery of protruding portion 111a. Power supply pads 81 are for electric supply to coil part 112, and are, as the circuit of coil board 80, connected to connecting terminals 82 and 83. The ends of coil part 112 (tilt coils 112A to 112D) are connected to these power supply pads 81 by soldering. Connecting terminals 82 and 83 extend outward from the rectangular portion of coil board 80 to be disposed on base member 111 (in this embodiment, laterally from base member 111). This allows electric supply to coil part 112 from connecting terminals 82 and 83 of coil board 80 extending outward.

In addition, displacement detection part 40 is mounted on coil board 80. Displacement detection part 40 is configured to contactlessly detect a position of movable part 12 that is attached to fixing part 11 via elastic supporting part 13, that is, a position of imaging module 14.

Displacement detection part 40 is mounted in Hall-element attachment portions 802 and 803 of coil board 80 (see FIGS. 5 to 8).

Hall-element attachment portions 802 and 803 are formed at positions of coil board 80 corresponding to the positions of pieces 111b and 111b of base member 111. To be more specific, Hall-element attachment portions 802 and 803 are formed to extend upward from one of two sides, which extend in the Y direction, of the outer edge of main board portion 801 of coil board 80 and from one of two sides, which extend in the X direction, of the outer edge of main board portion 801 of coil board 80, respectively. The portions of outer edge of main board portion 801 at which Hall-element attachment portions 802 and 803 are formed are other than the parts of outer periphery (outer edge) at which connecting terminals 82 and 83 are formed (particularly see FIG. 5).

There are slits 805 and 806 between Hall-element attachment portions 802 and 803 and main board portion 801, slits 805 and 806 being formed along one of two sides of the outer edge of main board portion 801 extending in the Y direction and along one of two sides of the outer edge of main board portion 801 extending in the X direction.

Pieces 111b and 111b of base member 111 are inserted in these slits 805 and 806. FIG. 8 illustrates the state where piece 111b is inserted in slit 805. Hall-element attachment portions 802 and 803 are disposed respectively at the external surface sides of pieces 111b and 111b inserted in slits 805 and 806 of coil board 80.

Displacement detection part 40 (below-described Hall elements 40a and 40b) mounted in Hall-element attachment portions 802 and 803 is positioned by inserting pieces 111b and 111b in slits 805 and 806. In addition, displacement detection part 40 is then brought into contact with the base of cutout 111c of piece 111b, so that displacement detection part 40 is positioned in the Z direction with even higher precision.

Displacement detection part 40 is fixed, for example adhesively, to the base of cutout 111c with which displacement detection part 40 is brought into contact. In the meanwhile, displacement detection part 40 may be configured to be fit inside cutout 111c. In this case, the movement of displacement detection part 40 is restricted not only in the Z direction but also in one of the X and Y directions being orthogonal to the Z direction, thus resulting in positioning of displacement detection part 40. In addition, it is preferable that Hall-element attachment portions 802 and 803 be fixed, for example adhesively, to pieces 111b and 111b after positioning of displacement detection part 40, respectively.

Displacement detection part 40 senses the movement (rotational sway) of movable part 12, that is, the movement of imaging module 14, and detects the position of movable part 12, that is, the position of imaging module 14 in directions in the plane (the X and Y directions) orthogonal to the optical-axis direction. In other words, displacement detection part 40 senses rotational sway of movable part 12, that is, senses the pose of imaging module 14, and detects tilt with respect to the X- or Y-axis. Note that displacement detection part 40 is connected to connecting terminals 82 and 83 via the wiring pattern of coil board 80, that is, a wiring pattern of Hall-element attachment portions 802 and 803 and main board portion 801.

Coil board 80 makes possible electric supply to coil part 112, and makes possible output and/or input of the signal of displacement detection part 40 to connected parts via connecting terminals 82 and 83. In this embodiment, connecting terminals 82 and 83 are connected to connecting terminals 92 and 93 of rigid portion 70a, so that the detection signal of displacement detection part 40 is output to the circuit of rigid portion 70a. Note that the detection signal of displacement detection part 40 is output to the control part (not illustrated) via the circuit of rigid portion 70a.

Displacement detection part 40 is composed, for example, of a Hall element and the like. In this embodiment, displacement detection part 40 is composed of two Hall elements (first and second Hall elements) 40a and 40b that are a magnetic position detection part.

Hall elements 40a and 40b constituting displacement detection part 40 are mounted in coil board 80 (to Hall-element attachment portions 802 and 803) in such a manner as to be spaced apart from and to face two (permanent magnets 122A and 122B) of four pieces of permanent magnets 122A to 122D constituting magnet part 122, respectively. For example, Hall elements 40a and 40b are disposed such that the magnetic leakage fluxes from permanent magnets 122A and 122B transverse Hall elements 40a and 40b in the Z direction, respectively. For instance, Hall elements 40a and 40b are disposed to transverse the flowing directions of magnetic fluxes from the N-pole to the S-pole of permanent magnets 122A and 122B, respectively. To be specific, Hall elements 40a and 40b are mounted in coil board 80 at the outside of tilt coils 112A and 112B constituting coil part 112 along the directions of the X- and Y-axes alongside of tilt coils 112A and 112B, respectively. In this embodiment, Hall elements 40a and 40b are disposed in cutouts 111c of pieces 111b, so that Hall elements 40a and 40b face middle portions of tilt coils 112A and 112B in the longitudinal direction, respectively.

Permanent magnets 122A and 122B are disposed inside tilt coils 112A and 112B, respectively, and accordingly Hall elements 40a and 40b are located to face permanent magnets 122A and 122B, respectively. In this way, Hall elements 40a and 40b are mounted at the outside of tilt coils 112A and 112B on coil board 80 alongside of these tilt coils 112 and 112B, and face permanent magnets 122A and 122B disposed inside tilt coils 112A and 112B.

To be more specific, one Hall element 40a detects the magnetic force of permanent magnet 122A from which this Hall element 40a is spaced apart in first direction X orthogonal to optical axis O (see FIG. 5) and which this Hall element 40a faces, to thereby detect a first position resulted from the movement (sway) in first direction X.

The other one of Hall elements 40b detects the magnetic force of permanent magnet 122B from which this Hall element 40b is spaced apart in second direction Y orthogonal to optical axis O and which this Hall element 40b faces, to thereby detect a second position resulted from the movement (sway) in second direction Y.

Hall element 40a can detect the movement amount of permanent magnet 122A in the X-axis direction, and Hall element 40b can detect the movement amount of permanent magnet 122B in the Y-axis direction. In other words, Hall elements 40a and 40b detect the movement amounts of the imaging module in the directions of X- and Y-axes, that is, the movement of the imaging module in the plane orthogonal to the optical axis.

In this way, the control part causes electricity to be supplied to coil part 112 via driver IC 60 for shake correction of imaging module 14 based on shake of fixing part 11 (camera module 100 itself) detected by shake detection part (gyro sensor) 15 and on the detection position obtained by Hall elements 40a and 40b. This causes movable part 12 (imaging module 14) to move to a position corresponding to the movement amounts of imaging module 14 in the X- and Y-axes directions, so that the shake is corrected.

In addition, Hall elements 40a and 40b (displacement detection part 40) can detect the movement amounts of the imaging module 14 in the directions of X- and Y-axes, so that Hall elements 40a and 40b can detect an offset due to the dead weight of imaging module 14 (dead weight sagging) or an offset due to the reactive force of the FPC of imaging module 14 of when movable part 12 is attached to fixing part 11.

In this manner, in camera module 100, an offset position of imaging module 14 is detected and corrected using displacement detection part 40, so that imaging module 14 can be precisely disposed without being tilted. In other words, the control part (not illustrated) controls (so-called feedback control) the current for energization of coil part 112 based on the detection signal obtained by displacement detection part 40 during shake correction of shake (angular shake) of camera module 100 itself corresponding to the detection signal of shake detection part 15 such that movable part 12 and imaging module 14 returns to the reference position.

Coil part 112 is composed of four tilt coils 112A to 112D and is disposed at coil board 80 to surround protruding portion 111a. In this embodiment, tilt coils 112A to 112D are disposed on coil board 80 at positions sandwiched between power supply pads 81, respectively. Coil part 112 (tilt coils 112A to 112D) is disposed such that the winding axis of each coil is oriented in the direction in which base member 111 and yoke (holding member) 120 face each other (in this case, in the Z direction). Tilt coils 112A to 112D are each connected to power supply pads 81 located on both sides of each tilt coil 112A to 112D by soldering. In this way, electricity is supplied to each of tilt coils 112A to 112D via power supply pads 81.

Tilt coils 112A and 112C face each other in the X direction, and tilt coils 112A and 112C are used to rotationally sway (0Y) movable part 12 around the Y axis. Tilt coils 112B and 112D face each other in the Y direction, and tilt coils 112B and 112D are used to rotationally sway (0X) movable part 12 around the X axis.

Skirt member 114 is a frame-shaped member composed of four walls 114b coupled with each other in a rectangular shape, and includes reception port 114a for imaging module 14. Skirt member 114 includes cutouts 1141 at positions corresponding to protruding side portions 1111 of base member 111, that is, at respective middle portions of lower ends of walls 114b of skirt member 114. Skirt member 114 includes, at upper portions of respective walls 114b, restriction portions 114d that slightly protrude from the respective upper portions toward the inside and form a rectangular frame, and restriction portions 114d prevent movable part 12 disposed in the frame, that is, in reception port 114a of skirt member 114 from being excessively tilted.

After movable part 12 is attached to base member 111 via elastic supporting part 13, skirt member 114 is fixed by being fit at the outside of the peripheral edge of base member 111. Movable part 12 is set between base member 111 and skirt member 114.

Cover member 115 is a capped rectangular cylindrical member, which includes opening (opened portion) 115a in the cap at the top surface of the cylindrical member. Opened portion 115a in cover member 115 allows lens part 141 of imaging module 14 to face outside. Cover member 115 includes, at the lower end of its cylindrical peripheral wall, cutouts 1151 formed at positions corresponding to protruding side portions 1111 of base member 111.

After imaging module 14 is mounted to OIS actuator A, cover member 115 is fit at the outside of skirt member 114 and cutouts 1151 are engaged with protruding side portions 1111 of base member 111, so that cover member 115 is fixed to base member 111. Drawing port 115b for imaging-module print wiring board 143 to be pulled to the outside is formed at one side surface of cover member 115.

Movable part 12 rotationally sways around the X axis and the Y axis with respect to fixing part 11. Movable part 12 includes yoke (holding member) 120, magnet part 122, and one pair of module guides 126. When imaging module 14 is mounted to OIS actuator A, yoke 120 directly holds imaging module 14. Imaging module 14 is bonded on the top surface of yoke 120 with a double-sided tape, resin adhesive agent, or the like, for example. With this construction, even without using positioning members such as the module guide disclosed in PTL 1, imaging module 14 can be fixed to yoke 120 with use of a jig while setting the position of imaging module 14 with high accuracy.

Yoke 120 is a rectangular frame-shaped member formed of a magnetic material, and includes rectangular frame-shaped yoke main body 121 (holding-part main body) and flat frame-shaped holding frame portion 1211 that is provided inside the frame shape of yoke main body 121 and that fixes imaging module 14 placed thereon.

Yoke main body 121 holds magnet part 122. Yoke main body 121 includes flat frame-shaped top plate portion 121*a* composed of four flat plates which are coupled with each other in a rectangular shape. Magnet part 122 is fixed on the underside of top plate portion 121*a*. Yoke main body 121 includes outside droop portion 121*b* along the outer peripheral edge of top plate portion 121*a* (in particular, outer edge of each flat plate composing top plate portion 121*a*). Outside droop portion 121*b* is formed in such a manner as to downwardly protrude and droop down. In addition, yoke main body 121 includes inside droop portion 121*c* along the inner peripheral edge of top plate portion 121*a* (in particular, inner edge of each flat plate composing top plate portion 121*a*). Inside droop portion 121*c* is formed in such a manner as to downwardly protrude and droop down. That is, the cross-sectional shape of one side portion of frame-shaped yoke main body 121 has a recessed shape open toward base member 111, that is, a downwardly open U-shape. Top plate portion 121*a* that forms the bottom surface inside this recessed shape is located more distant from base member 111 than holding frame portion 1211 is from base member 111. In addition, the outer peripheral edge of holding frame portion 1211 is connected to the lower end of inside droop portion 121*c* of yoke main body 121. The bottom surface of imaging module 14 is fixed on the top surface of holding frame portion 1211 (a part of the top surface of yoke 120), in particular on module attachment portion 1211*a* of holding frame portion 1211 with a double-sided tape or resin adhesive agent.

Yoke main body 121 has cutout 1213 at one of two outside droop portions 121*b* extending in the Y direction, and cutout 1214 at one of two outside droop portions 121*b* extending in the X direction. Hall elements 40*a* and 40*b* (see FIGS. 6 to 8) of displacement detection part 40 positioned by pieces 111*b* provided upright on base member 111 are disposed in cutout 1213 and 1214.

Figure 9:
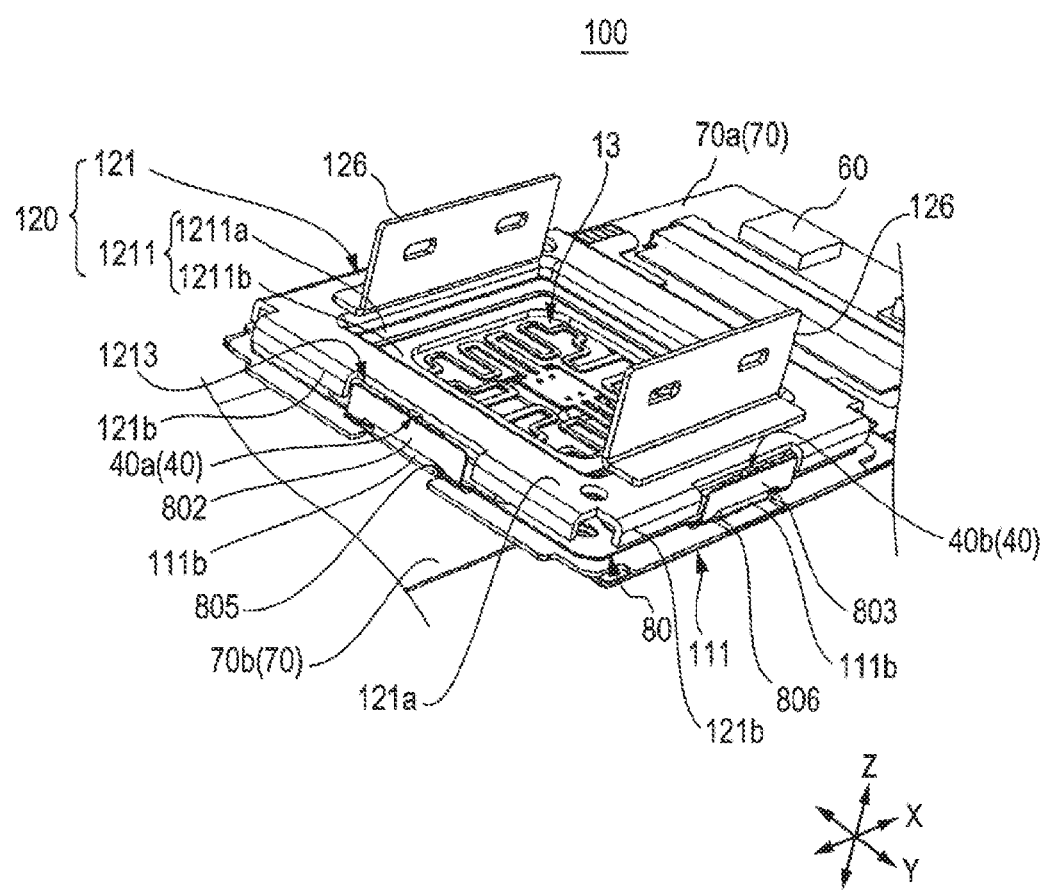
FIG. 9 is an explanatory fragmentary perspective view of a positional relationship between the displacement detection part and a yoke in the camera module.

FIG. 9 is an explanatory fragmentary perspective view of a positional relationship between the displacement detection part and the yoke. Note that, imaging module 14 and cover member 115 are omitted for convenience in the illustration of camera module 100 in FIG. 9.

As illustrated in FIGS. 5 to 9, cutouts 1213 and 1214 are formed by cutting out the middle portions of one of two outside droop portions 121*b* extending in the Y direction and one of two outside droop portions 121*b* extending in the X direction in such a manner as to open downward.

Pieces 111*b* and 111*b* are disposed in cutouts 1213 and 1214, so that displacement detection part 40 (Hall elements 40*a* and 40*b*) to be fixed by pieces 116 are disposed at their respective fixed positions. Note that FIGS. 6 and 7 illustrate a state where displacement detection part 40 (Hall elements 40*a* and 40*b*) is located in cutouts 1213 and 1214 together with pieces 111*b* and 111*b*.

Figure 10:
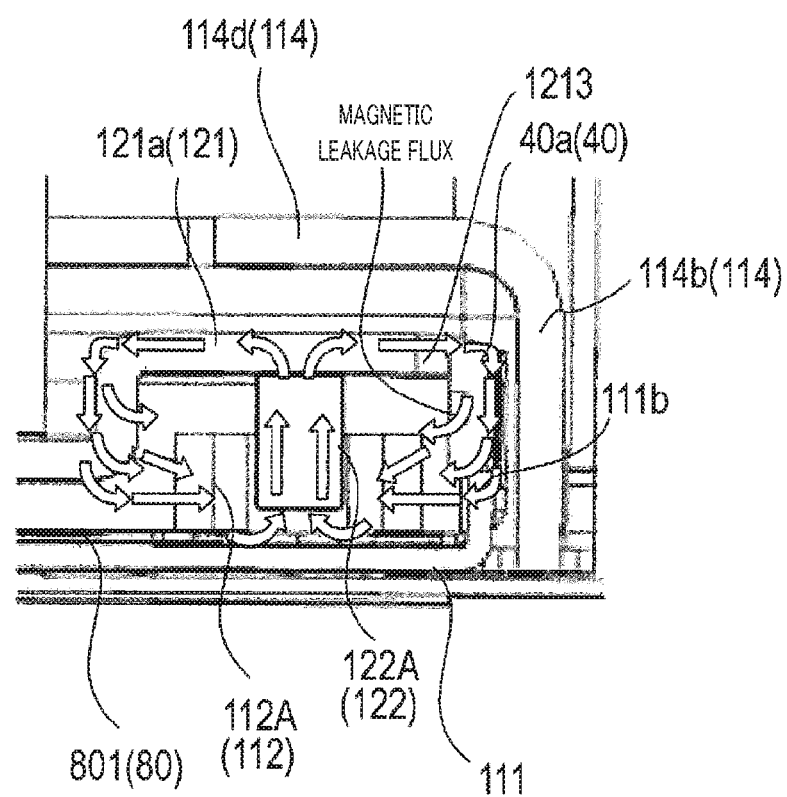
FIG. 10 is a schematic diagram illustrating the flow of magnetic flux in the camera module detected by the displacement detection part.

FIG. 10 is a schematic diagram illustrating the flow of the magnetic flux detected by displacement detection part 40. Note that FIG. 10 is an enlarged view schematically illustrating a region in FIG. 7 where Hall element 40*a* is attached.

As illustrated in FIG. 10, cutout 1213 is formed in yoke main body 121, and Hall element 40*a* as displacement detection part 40 is disposed in this cutout 1213, so that magnetic leakage flux MF from permanent magnet 122A of magnet part 122 is allowed to transverse displacement detection part 40 efficiently. The positional relationship of Hall element 40*b* to cutout 1214 is the same as that of Hall element 40*a* to cutout 1213, in which Hall element 40*b* detects the flow of magnetic flux. Descriptions for the positional relationship of Hall element 40*b* are omitted accordingly. In this way, displacement detection part 40 can detect tilt of movable part 12 with respect to the X- or Y-axis, that is, displacement of movable part 12 from the reference position based on change of magnetic leakage fluxes MF from permanent magnets 122A and 122B.

A step by which holding frame portion 1211 is brought closer to base member 111 than top plate portion 121*a* is to base member 111 is formed between holding frame portion 1211 and top plate portion 121*a*, and a recessed portion is formed in the center of entire yoke 120, in which imaging module 14 is fixed. This yoke 120 prevents the magnetic interference to imaging module 14 caused by the magnetic circuit including magnet part 122 and coil part 112.

Holding frame portion 1211 includes module attachment portion 1211*a* and gimbal attachment portion 1211*b* inside module attachment portion 1211*a*.

Module attachment portion 1211*a* is provided continuously to inside droop portion 121*c* of yoke main body 121, and in this embodiment, is formed as a rectangular frame plate extending perpendicularly to the Z axis direction including the optical axis. There is a step at the inside of module attachment portion 1211*a* with respect to module attachment portion 1211*a*, and gimbal attachment portion 1211*b* having the shape of a rectangular frame plate is provided at the inside of module attachment portion 1211*a*.

In particular, gimbal attachment portion 1211*b* is one step lower toward base member 111 than module attachment portion 1211*a*, and is formed to project radially inward from the inner peripheral edge of module attachment portion 1211*a* toward the center of module attachment portion 1211*a*. Elastic supporting part 13 is attached to the undersurface of gimbal attachment portion 1211*b* (see FIGS. 5 to 7).

Magnet part 122 is composed of four cuboid permanent magnets 122A to 122D corresponding to tilt coils 112A to 112D, as illustrated in FIG. 5. Electromagnets may be used in place of permanent magnets. Permanent magnets 122A to 122D each have a size which allows each of permanent magnets 122A to 122D to be put inside each of tilt coils 112A to 112D.

Permanent magnets 122A to 122D are disposed at the undersides of respective flat plates of yoke 120 such that the magnetization direction is the Z direction, and permanent magnets 122A to 122D are fixed by bonding, for example (see FIGS. 5 to 7 and 11).

In addition, permanent magnets 122A to 122D are located between inside droop portion 121*c* and outside droop portion 121*b* of yoke 120. In this case, permanent magnets 122A to 122D are each located to face both of inside droop portion 121*c* and outside droop portion 121*b* with gaps between each of permanent magnets 122A to 122D and inside droop portion 121*c* and between each of permanent magnets 122A to 122D and outside droop portion 121*b*.

Coil part 112 is located between magnet part 122 and yoke 120 (in particular, yoke main body 121) (see FIGS. 5 and 6). Magnet part 122 is located on the winding axis of winding of coil part 112. In yoke 120 and base member 111, magnet part 122 and coil part 112 are disposed such that the central portion of coil part 112 is opened along the bonding direction of imaging module 14, and magnet part 122 protrudes to the central portion of coil part 112.

In addition, magnet part 122 and coil part 112, namely the magnetic circuit part including magnet part 122 and coil part 112 are located peripherally (in particular, outward in the X and Y directions) with respect to the lower end of imaging module 14 and holding frame portion 1211. In other words, the magnetic circuit part including magnet part 122 and coil part 112 is not disposed directly below the lower end of imaging module 14 and holding frame portion 1211. That is, magnet part 122 (permanent magnets 122A to 122D) and coil part 112 (tilt coils 112A to 112D) are disposed on base member 111 peripherally with respect to the lower end of imaging module 14 and holding frame portion 1211 of yoke 120 in the X and Y directions.

Figure 11:
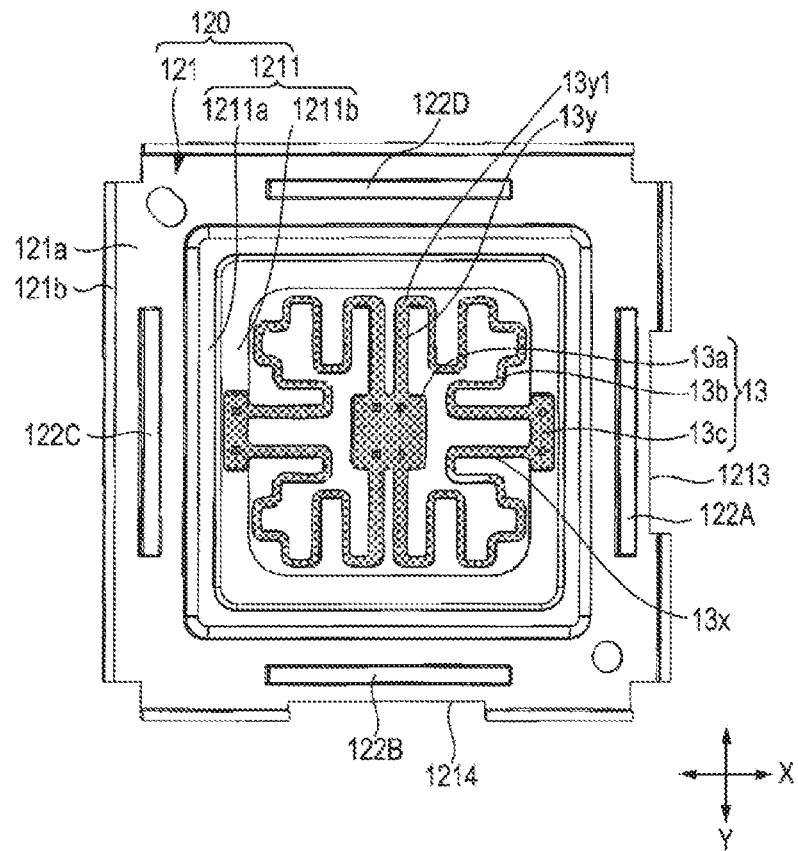
FIG. 11 is a bottom view of the yoke to which an elastic supporting part is attached.

Elastic supporting part 13 is composed of a rectangular member having a biaxial gimbal mechanism (so-called gimbal spring). FIG. 11 is a bottom view of yoke 120 to which elastic supporting part 13 is attached, and serves to explain elastic supporting part 13.

As illustrated in FIG. 11, elastic supporting part 13 includes center portion 13a and outer gimbal 13c continuously connected with center portion 13a with inner gimbal 13b therebetween. Outer gimbal 13c rotationally sways around the X axis and the Y axis. Note that the gimbal spring that is elastic supporting part 13 is indicated by hatching in an attempt to differentiate them from the other components in FIG. 11. Note that the gimbal spring is rectangular and planar and has a small thickness in the Z direction.

As illustrated in FIG. 11, center portion 13a is rectangular, and inner gimbal 13b has a complex curved shape. Inner gimbal 13b includes four gimbal shafts 13y and four gimbal shafts 13x at end portions of the curved shape. Four gimbal shafts 13y are joined to center portion 13a, and two pairs of gimbal shafts 13y extend from this central portion 13a in opposite directions along the Y axis, respectively. Four gimbal shafts 13x are joined to outer gimbal 13c, and two pairs of gimbal shafts 13x extend from this outer gimbal 13c in opposite directions along the X axis, respectively. Outer gimbal 13c takes the form of two elongated plates in this embodiment, and is joined to the back surface of gimbal attachment portion 1211b. Note that outer gimbal 13c is disposed outward from side portions (gimbal shafts 13x) which face each other at the central portion 13a and which extend along the X direction, and outer gimbal 13c is disposed in parallel with side portions (gimbal shafts 13y). Outer gimbal 13c is connected, at the middle of outer gimbal 13c, to gimbal shafts 13x that are one ends of inner gimbal 13b. Note that the other ends (ends of gimbal shafts 13y) of inner gimbal 13b are connected to center portion 13a.

Center portion 13a of elastic supporting part 13 is brought into contact with protruding portion 111a of base member 111 and is bonded or welded thereto. As a result, a peripheral portion with respect to center portion 13a of elastic supporting part 13 is located in such a manner as to be vertically spaced apart from the top surface of base member 111 by a predetermined distance, as illustrated in FIG. 7. In this respect, this predetermined distance corresponds to a range in which elastic supporting part 13 is movable when elastic supporting part 13 turns around the central axes in the X and Y directions about which elastic supporting part 13 is movable. In addition, as illustrated in FIG. 11, outer gimbal 13c of elastic supporting part 13 is bonded or welded to a pair of parallel side portions on the underside of holding frame portion 1211 of yoke 120. In this manner, movable part 12 is disposed at an approximate center of base member 111 in a floating fashion, making it possible for movable part 12 to rotationally sway around the X axis and the Y axis. Movable part 12 is thus supported to be capable of free tilting movement in the directions of X- and Y-axes with its central portion as a center. Since elastic supporting part 13 is fixed to base member 111 by bonding, it is not necessary to provide lock members such as the stopper disclosed in PTL 1. Elastic supporting part 13 is attached via outer gimbal 13c to the undersurface of gimbal attachment portion 1211b located lower than module attachment portion 1211a in holding frame portion 1211 including the upper surface (module attachment portion 1211a) to which imaging module 14 is bonded. The distance in the Z direction between elastic supporting part 13 and imaging module 14 substantially corresponds to the thickness of holding frame portion 1211. In this embodiment, the thickness of holding frame portion 1211 includes the thicknesses of module attachment portion 1211a and gimbal attachment portion 1211b which form holding frame portion 1211, and additionally includes the length of the step between both of them. In this way, the length in the Z direction of camera module 100 itself can be reduced, that is, the height reduction of camera module 100 can be achieved.

The gimbal spring as elastic supporting part 13 according to the present embodiment is attached, at places of the gimbal spring along the X direction, to gimbal attachment portion 1211b of holding frame portion 1211 that is one step lower than module attachment portion 1211a, as illustrated in FIGS. 5 and 7. In contrast, the gimbal spring as elastic supporting part 13 is not attached, at portions of the gimbal spring along the Y direction, to yoke 120 including holding frame portion 1211, as illustrated in FIGS. 5 and 6.

Figure 12:
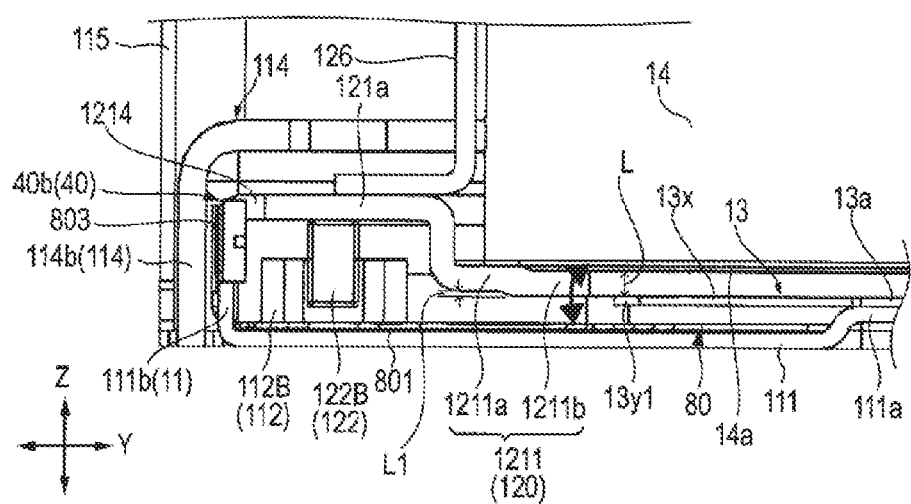
FIG. 12 is an enlarged view illustrating a region in FIG. 7 where a gimbal attachment portion is attached to the elastic supporting part.

FIG. 12 is an enlarged view illustrating the positional relationship between gimbal attachment portion 1211b and the gimbal spring as elastic supporting part 13 in FIG. 7.

With elastic supporting part 13 according to the present embodiment, bottom surface 14a of imaging module 14 approaches one side of gimbal shaft 13y of elastic supporting part 13 extending along the Y-axis (see FIGS. 11 and 12) (in particular, end portion 13y1 of gimbal shaft 13y) when movable part 12 rotationally sways about the X-axis. That is, the range of rotational sway (indicated by the bold arrow in FIG. 12) of movable part 12 is limited by clearance L between imaging module 14 and elastic supporting part 13.

In the present embodiment, gimbal attachment portion 1211b of yoke 120 is formed to be one step lower than module attachment portion 1211a, so that the clearance between imaging module 14 and elastic supporting part 13 is greater by this lowering step, in which case the clearance corresponds to distance L1 indicated in FIG. 12. This enlarges the movable range of movable part 12 in comparison with the case where imaging module 14 is fixed to gimbal attachment portion 1211b.

A pair of module guides 126 is provided to stand upright on yoke 120. Module guides 126 are disposed to face opposite lateral surfaces of imaging module 14 attached to holding frame portion 1211, respectively. In this way, module guides 126 serve for placing imaging module 14 on holding frame portion 1211 of yoke 120 and for fixing it thereto. Then, a pair of module guides 126 is also fixed to the opposite lateral surfaces of imaging module 14 via a binding material or the like. Accordingly, imaging module 14 can accurately be attached to movable part 12, so that reliability can be increased. Note that module guides 126 are provided to protrude upward through reception port 114a of skirt member 114 together with imaging module 14.

As illustrated in FIGS. 5 to 7, imaging module 14 includes lens part 141, an imaging device (not illustrated), AF actuator 142, and imaging-module print wiring board 143.

The imaging device (not illustrated) is composed of, for example, a CCD (charge coupled device) image sensor, a CMOS (complementary metal oxide semiconductor) image sensor, or the like. The imaging device (not illustrated) is mounted to imaging-module print wiring board 143. The imaging device (not illustrated) captures a subject image imaged by lens part 141.

AF actuator 142 includes an AF voice coil motor for example, and moves lens part 141 in the optical-axis direction by utilizing the driving force of AF voice coil motor. Publicly known techniques can be applied to AF actuator 142.

Imaging-module print wiring board 143 is here composed of flexible printed circuits having flexibility. Imaging-module print wiring board 143 includes a power-source line (not illustrated) configured to feed power to a coil part (not illustrated) of AF actuator 142, and a video signal line (not illustrated) for video signals output from the imaging device. As illustrated in FIG. 7, imaging-module print wiring board 143 is pulled to the outside through drawing port 115b of cover member 115 from the inside of skirt member 114 and over skirt member 114 in the state where imaging module 14 is mounted in OIS actuator A. To be more specific, imaging-module print wiring board 143 extends out upwardly from the underside of imaging module 14, is bent to extend to the outside of skirt portion when reached a predetermined distance above skirt member 114, and then extends out from drawing port 115b of cover member 115. Imaging-module print wiring board 143 pulled out is connected to rigid portion 70a of fixing part 11. Imaging-module print wiring board 143 is flexible, and therefore does not disturb the movement of movable part 12 although imaging-module print wiring board 143 is provided in movable part 12 as described above. In the meantime, branching may be provided in imaging-module print wiring board 143 to equip the power-source line and the video signal line with different connectors.

In OIS actuator A, the magnetic circuit part including magnet part 122 (permanent magnets 122A to 122D) and coil part 112 (tilt coils 112A to 112D) is disposed on base member 111 peripherally with respect to the lower end of imaging module 14 and holding frame portion 1211 of yoke 120 in the X and Y directions.

The magnetic circuit part is disposed at such a position that a part of the magnetic circuit part is overlaid by the lower end of imaging module 14 and holding frame portion 1211 of yoke 120 in the X and Y directions. In other words, the magnetic circuit part is disposed at such a position that one of magnet part 122 and coil part 112 (in this case, magnet part 122) is overlaid by the lower end of imaging module 14 and holding frame portion 1211 of yoke 120 in the X and Y directions. In this embodiment, permanent magnets 122A to 122D constituting magnet part 122 are disposed above tilt coils 112A to 112D constituting coil part 112 in such a manner as to be partially inserted inside tilt coils 112A to 112D. In this manner, permanent magnets 122A to 122D are disposed above respective tilt coils 112A to 112D along the winding axes directions of respective tilt coils 112A to 112D (Z direction).

In the OIS voice coil motor including magnet part 122 and coil part 112 disposed as described above, in an initial state where no current flows through coil part 112, imaging module 14 (movable part 12) is held at a neutral position where the optical axis coincides with the Z direction. In this respect, in a case where imaging module 14 (movable part 12) is offset from the neutral position due to dead weight sagging or the like when movable body 12 is attached to fixing part 11, the position of movable part 12 is corrected using the offset position detected by displacement detection part 40 to the neutral position where the optical axis coincides with the Z direction.

When a current flows through coil part 112, a Lorentz force in the Z direction is generated at coil part 112 by interaction between the magnetic field of magnet part 122 and the current flowing through coil part 112 (Fleming's left hand rule). Since coil part 112 is fixed, a reactive force is exerted on magnet part 122 that is movable part 12. This reactive force is the driving force of the OIS voice coil motor.

To be more specific, when opposite currents are supplied to tilt coils 112A and 112C facing each other in the X-axis direction, opposite forces in the Z direction act on permanent magnets 122A and 122C. Accordingly, movable part 12 including imaging module 14 rotationally sways around the Y axis with center portion 13a of elastic supporting part 13 as a fulcrum. Likewise, when opposite currents are supplied through tilt coils 112B and 112D facing each other in the Y-axis direction, movable part 12 including imaging module 14 rotationally sways around the X axis with center portion 13a of elastic supporting part 13 as a fulcrum. Movable part 12 rotationally sways until the driving force of the OIS voice coil motor (force which acts on magnet part 122) and the restoration force of elastic supporting part 13 become equivalent to each other.

At this time, the current for energization of coil part 112 is controlled based on the detection result of displacement detection part 40 such that rotational sway of movable part 12 cancels out the shake of imaging module 14. In this manner, the shift of the optical axis due to shake is corrected, and the orientation of the optical axis is kept at an orientation.

OIS actuator A including fixing part 11, movable part 12, and elastic supporting part 13 as described above is configured to be mounted on rigid FPC 70 via coil board 80. This enables evaluation (checking of operations) of actuator A alone by connecting OIS actuator A via connecting terminals 82 and 83 of coil board 80 to an inspection and evaluation device capable of checking operations of actuator A after OIS actuator A is assembled and before OIS actuator A is mounted on and connected to rigid FPC 70. It is thus possible not to use an actuator in which a malfunction is found and to produce camera module 100 by mounting, on rigid FPC 70, only an actuator of fine quality which meets the evaluation standards. This can prevent rigid FPC 70 on which the expensive parts, such as the gyro sensor as shake detection part 15, driver IC 60, and the like, are mounted, and which is expensive itself from becoming unusable together with a malfunctioning OIS actuator. Connecting terminals 82 and 83 of coil board 80 are subsequently connected to connecting terminals 92 and 93 of rigid FPC 70 and actuator A is thereby connected to rigid FPC 70, so that it is possible to produce highly reliable camera module 100 while reducing production cost.

In the present embodiment, fixing part 11 includes pieces 111b and 111b which are provided to stand upright from coil board 80 and which face toward first and second coils 112A and 112B laterally in first and second directions X and Y, respectively. Pieces 111b and 111b each include a recess (cutout 111c) which is engaged with and comes into contact with first and second Hall elements 40a and 40b so as to position first and second Hall elements 40a and 40b at least in the optical-axis direction. In other words, displacement detection part 40 is disposed in pieces 111b and 111b which are provided outward from coil part 112 to stand upright from base member 111 and face said coil part 112.

Displacement detection part 40 is brought into contact with cutout 111c at the inside of cutout 111c of piece 111b, so that displacement detection part 40 is positioned at a position in which displacement detection part 40 can efficiently detect the flow of the magnetic fluxes formed between coil part 112 and magnet part 122 located inside coil part 112. In particular, Hall elements 40a and 40b as displacement detection part 40 are fixed inside recessed cutouts 111c while brought into contact with recessed cutouts 111c which is cut out to open upward and which has the base at a predetermined height from base member 111.

This makes it possible to position displacement detection part 40 especially in the Z direction, which is important for position detection since the Z direction is a direction of rotational sway of magnet part 122 with respect to coil part 112 and the magnetic flux direction changes depending on movements, even when a component tolerance and/or an assembly tolerance arise. In addition, it is also made possible to perform position detection at high power. That is, the attachment positions of Hall elements 40a and 40b do not vary depending on precision of components, and thus, variations in characteristics of Hall output can be reduced.

In addition, it is not necessary to attach displacement detection part 40 to walls 114b of skirt member 114 in a configuration in which displacement detection part 40 (Hall elements 40a and 40b) is disposed on the lateral surface of camera module 100, that is, outward from coil part 112. It may be considered to make a hole in walls 114b of skirt member 114, and to externally insert displacement detection part 40 in the hole for attachment of displacement detection part 40 (Hall elements 40a and 40b) to skirt member 114. In such a configuration, the wiring for displacement detection part 40 (for example, FPC) is inevitably exposed at the outer surface of skirt member 114. This causes a risk in which disconnection may arise in the FPC by the FPC being touched and damaged during assembly of camera module 100 or 100A, in particular during when actuator A is connected to rigid FPC 70.

In the present embodiment, disconnection can be prevented since the wiring (for example, FPC) for displacement detection part 40 is formed inside skirt member 114, and thus the FPC is not touched by an extraneous matter.

In addition, it is not necessary to attach the FPC to walls 114b of skirt member 114, particularly to the lateral surface of skirt member 114, so that the size of external shape of the camera module is not made larger by the thickness of the FPC.

In the present embodiment, elastic supporting part (supporting part) 13 supports movable part 12 with respect to fixing part 11 by the elastic deformation of elastic supporting part 13 such that movable part 12 can be tilted. Frame-shaped holding member (yoke) 120 includes frame-shaped module attachment portion 1211a on which imaging module 14 is mounted, and supporting-part attachment portion (gimbal attachment portion) 1211b which is disposed at the inside of module attachment portion 1211a and in which elastic supporting part 13 is attached to the stepped surface lower than module attachment portion 1211a.

To be more specific, gimbal attachment portion 1211b of yoke 120 is formed to be one step lower than holding frame portion 1211a, so that the clearance between imaging module 14 and elastic supporting part 13 is greater by this step formed to be one step lower (see clearance L in FIG. 12). That is, the bottom of imaging module 14 is disposed at a position spaced apart in advance from elastic supporting part 13 that is a gimbal. In this way, compared to the case where imaging module 14 is fixed to gimbal attachment portion 1211b, imaging module 14 does not come into contact with the gimbal spring as elastic supporting part 13 (in particular, with end portion 13y1 of gimbal shaft 13y extending in the Y direction) even when movable part 12 is moved to sway in a twisting manner about the X-axis. Accordingly, the movable range of movable part 12 can be enlarged in comparison with the camera module having a configuration in which imaging module 14 is fixed to gimbal attachment portion 1211b.

With the configuration in which a gimbal is used as elastic supporting part 13 as in the present embodiment, movable part 12 attached to the outer edge side of elastic supporting part 13 is supported to be able to sway about the center portion which is square in plan view and which is fixed to fixing part 11. Even when it is desired to increase the size of the gimbal as elastic supporting part 13 (the size of the gimbal in the X and Y directions), for example, it has been impossible in such a configuration to increase the size of the gimbal as elastic supporting part 13 since the larger the size is, the shorter the distance becomes in which the gimbal itself (in particular, outer edge portions located along the swaying direction) approaches imaging module 14 during sway of movable part 12, so that the movable range is made narrower. The collision between the gimbal spring and imaging module 14 also causes spring bending.

In contrast, with camera module 100 or the lens driving device included in camera module 100 according to the present embodiment, imaging module 14 and the gimbal itself can be located to be spaced apart from each other in the swaying direction, that is, in the height direction in advance. This allows flexibility of designs of the gimbal and the camera module itself (for example, the size of the gimbal or the camera module itself can be increased).

Note that although the number of terminals of coil board 80 is 12 in camera module 100 of the present embodiment, the number of terminals is not limited to 12 and may be any number as long as it corresponds to that of input and output terminals of components used in OIS actuator A.

In addition, although a configuration is employed in camera module 100 in which Hall elements 40a and 40b as displacement detection part 40 are provided on the side of OIS actuator A, they may be provided on the side of rigid FPC 70.

(Modification)

Figure 13:
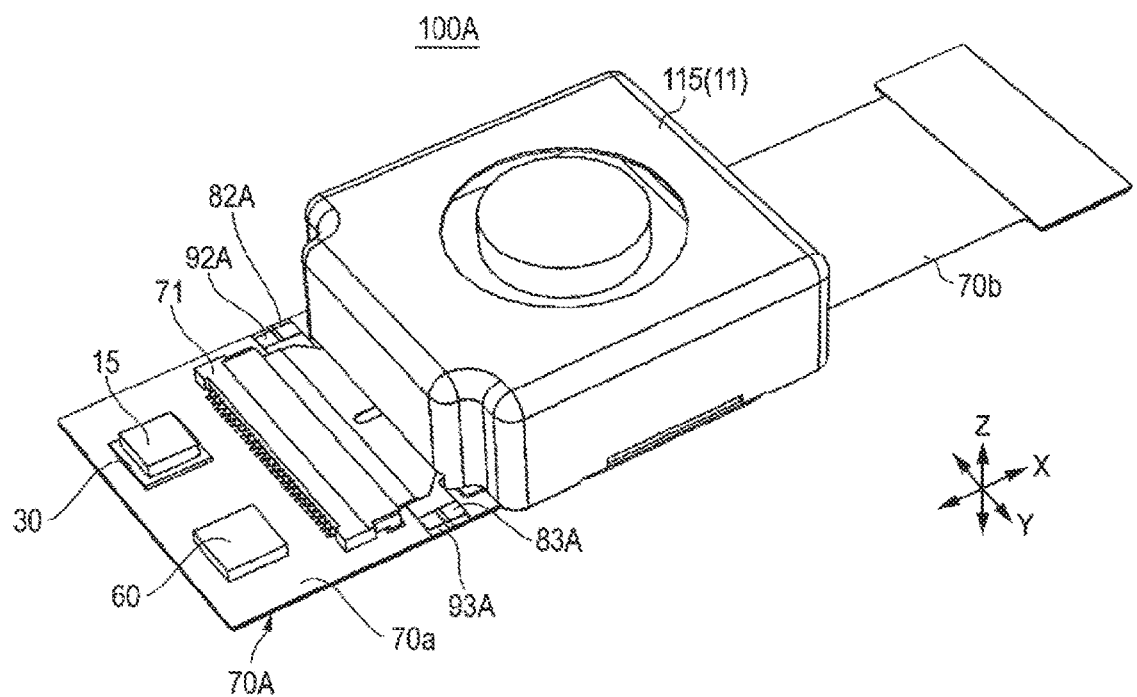
FIG. 13 is a perspective view of an external appearance of a camera module as a modification.
Figure 14:
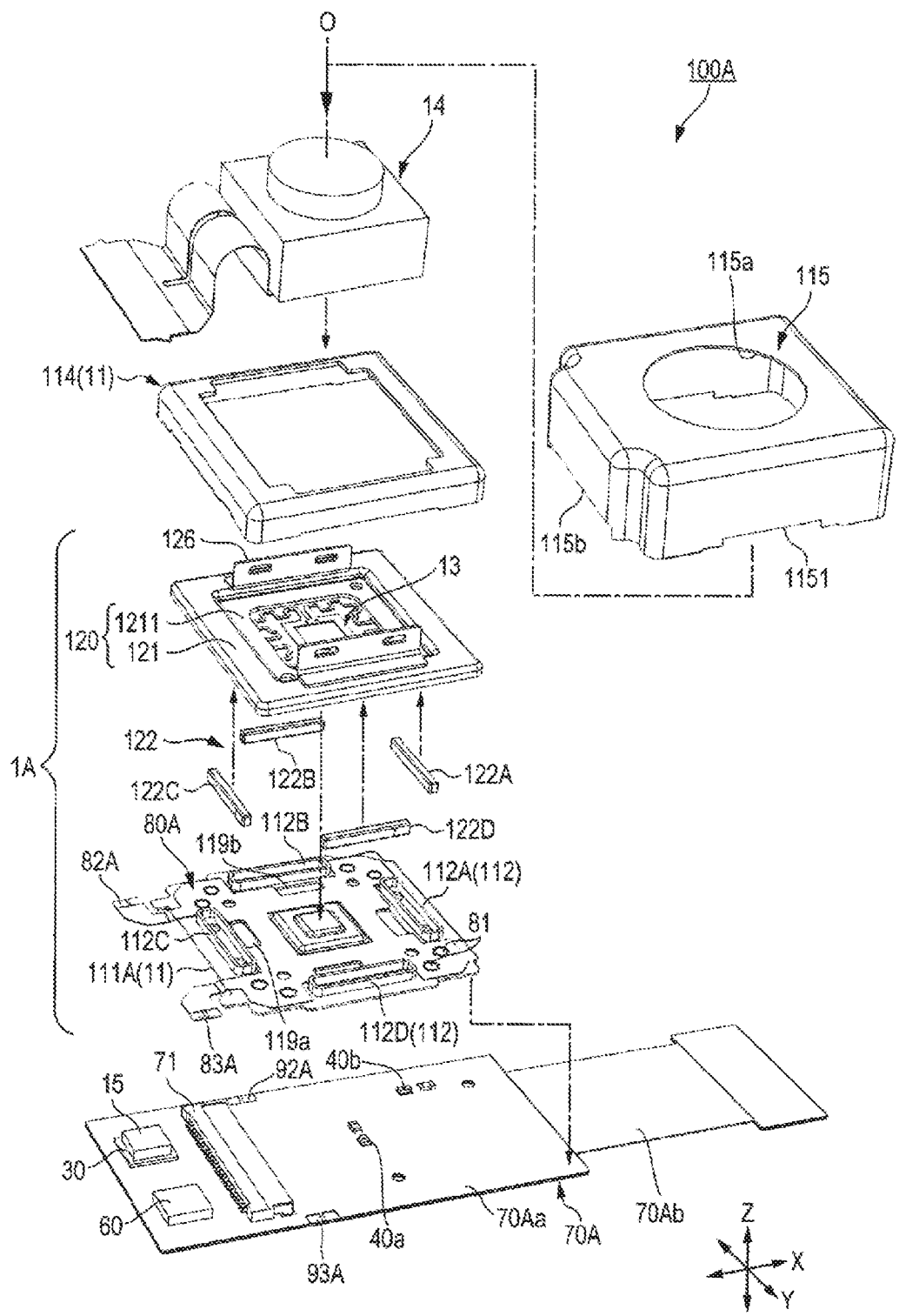
FIG. 14 is an exploded perspective view of the camera module as the modification.
Figure 15:
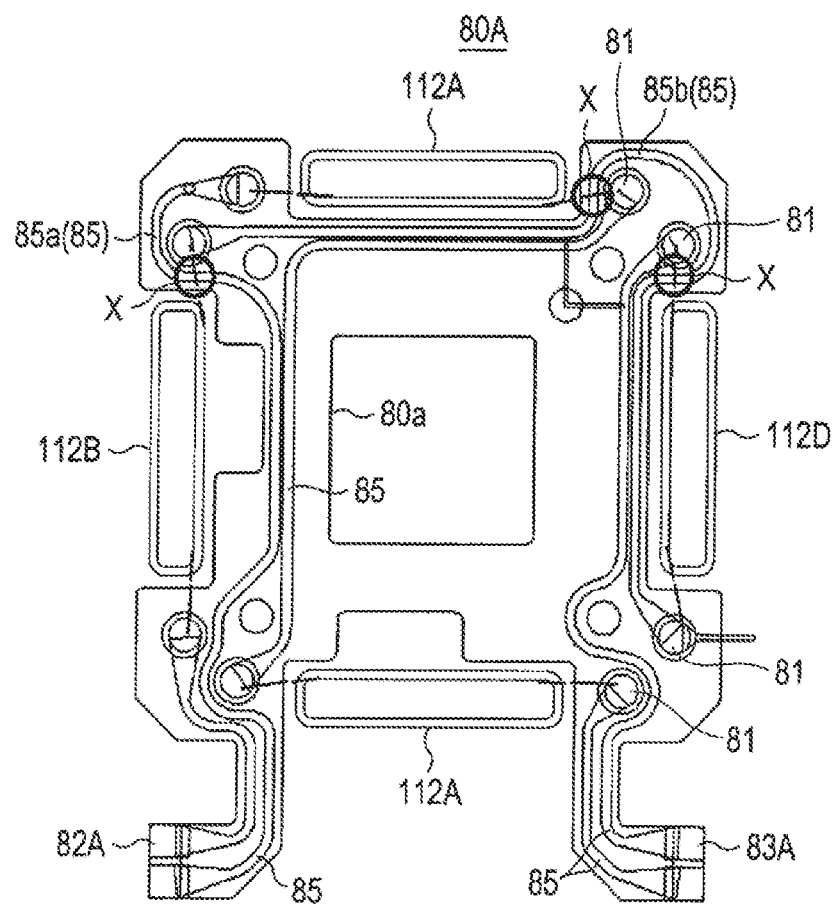
FIG. 15 is a plan view illustrating a wiring pattern on a coil board in the camera module as the modification.

FIG. 13 is a perspective view of an external appearance illustrating a modification of camera module according to one embodiment of the present invention, FIG. 14 is an exploded perspective view of the camera module, and FIG. 15 is a plan view of an example of wiring pattern of coil board 80A in the camera module.

Camera module 100A illustrated in FIGS. 13 and 14 differs from camera module 100 in that, in the configuration of camera module 100A, displacement detection part 40 is provided not on the side of OIS actuator 1A but on the side of rigid FPC 70A. Accordingly, the number of terminals of coil board 80A (connecting terminals 82A and 83A) is also changed so as to correspond to the number of terminals of OIS actuator 1A. In this case, coil board 80A includes wiring for four terminals. In other respects, camera module 100A has the same effect as camera module 100. Accordingly, components of camera module 100A in the modification that are the same as those of camera module 100 are provided with the same references and the same names, and descriptions for those components are omitted for the reason that those components have the same effect.

As illustrated in FIG. 14, Hall elements 40a and 40b are provided to the rigid FPC 70A to which OIS actuator 1A is attached. Note that rigid FPC 70A includes rigid portion 70Aa and flexible portion 70Ab. As with the configuration of rigid portion 70a, driver IC 60, shake detection part 15 to be mounted on rigid FPC 70A via intermediary substrate 30, AF driving connector 71, and connecting terminals 92A and 93A are mounted on rigid portion 70Aa and connected to a circuit which is to be connected to rigid portion 70Aa. Connecting terminals 92A and 93A are disposed so as to correspond to connecting terminals 82A and 83A, and are connected to terminals 82A and 83A, respectively.

In detail, Hall elements 40a and 40b are disposed on rigid portion 70Aa of rigid FPC 70A in such a manner as to be exposed in regions of base member 111A above rigid FPC 70A.

Base member 111A and coil board 80A, which are to be placed on rigid FPC 70A, are respectively provided with cutouts 119a and 119b extending through base member 111A and coil board 80A at places the same as those of Hall elements 40a and 40b which are to be exposed on rigid FPC 70A.

Hall elements 40a and 40b are exposed through these cutouts 119a and 119b on coil board 80A placed on base member 111, and are disposed to face two of four pieces of permanent magnets 122A to 122D of magnet part 122 while spaced apart from these two permanent magnets, respectively. In camera module 100A, Hall elements 40a and 40b mounted on rigid FPC 70A are disposed to transverse the directions of from the N-poles to the S-poles in permanent magnets 122B and 122C, respectively.

To be specific, Hall elements 40a and 40b are disposed on the center side (optical axis side) of tilt coils 112C and 112B along the directions of the X- and Y-axes of coil part 112. In this configuration, permanent magnets 122B and 122C are disposed inside tilt coils 112B and 112C, respectively, so that Hall elements 40a and 40b are located to face permanent magnets 122C and 122B, respectively. It is thus possible in camera module 100A to detect displacement more accurately since Hall elements 40a and 40b are disposed below imaging module 14, that is, near imaging module 14.

The function of Hall elements 40a and 40b in camera module 100A is the same as that of Hall elements 40a and 40b in camera module 100. That is, in a case where the left side along the X direction in FIG. 14 is the front and the right side is the rear, one Hall element 40a is disposed on the front side with respect to optical axis O in first direction (front-rear direction) X, and detects a first position resulted from the movement (sway) in first direction (front-rear direction) X by detecting the magnetic force of permanent magnet 122C which faces Hall element 40a while located outward from Hall element 40a. The other one of Hall elements 40b is disposed rightward with respect to optical axis O in second (left-right direction) Y, and detects a second position resulted from the movement (sway) in second (left-right direction) Y by detecting the magnetic force of permanent magnet 122B facing Hall element 40b.

In the meanwhile, coil board 80A is an FPC and differs from coil board 80 in that Hall elements 40a and 40b are not mounted on coil board 80A. In coil board 80A, as illustrated in FIG. 15, point-to-point wiring is used to connect between both ends of each of tilt coils 112A to 112D and power supply pads 81. In addition, wiring printed on coil board 80A (printed wiring traces 85a and 85b among printed wiring traces 85) is routed under the point-to-point wires to cross these wires in regions X, and in this way, the single-sided FPC structure is achieved. Note that, FPC traces 85 of coil board 80A are connected such that the current flowing out from one of connecting terminals 82A and 83A passes through tilt coils opposite one another to the other one of connecting terminals 82A and 83A. Such routing of the wiring on FPC 70 makes it possible not to change the directions of magnets 122A to 122D, directions of tilt coils 112A to 112D, and the like in comparison with a module having 12 terminals, and not to use a double-sided FPC, so that the cost reduction and space saving can be achieved.

Note that in camera module 100A according to the modification, Hall elements 40a and 40b, which are necessary to evaluate OIS actuator 1A alone using an inspection and evaluation device, are not provided to OIS actuator 1A. For this reason, when the outputs of Hall element 40a and 40b are to be inspected, it is possible to provide a Hall element to the inspection and evaluation device to obtain an output of the Hall element, so as to inspect and evaluate operations in which the output of the Hall element is used.

In the meanwhile, although a configuration in which main body cover member 115 covers movable part 12 and skirt member 114 of fixing part 11 covering movable part 12 is employed in camera module 100 according to the embodiment and camera module 100A as the modification, main body cover member 115 is not limited to this configuration.

Figure 16:
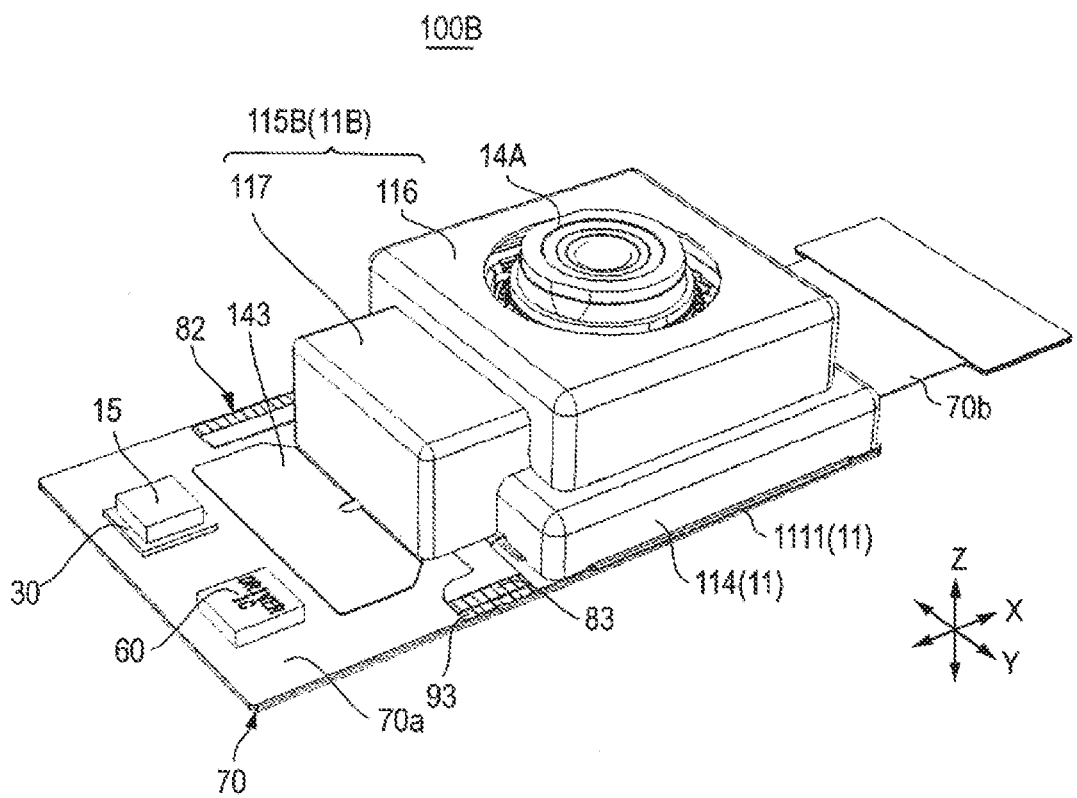
FIG. 16 is a perspective view of an external appearance of a camera module as another modification.

For example, camera module 100 may include, instead of main body cover member 115 in camera module 100 of Embodiment 1, main body cover member 115B including stacking cover member 116 to be placed above skirt member 114 and circuit board cover member 117, as in camera module 100B illustrated in FIG. 16. Stacking cover member 116 covers, together with skirt member 114, movable part 12 and imaging module 14 attached to movable part 12 such that movable part 12 and imaging module 14 can be rotationally swayed freely. In addition, stacking cover member 116 has the same functions as main body cover member 115. Examples of the functions may include a function of restricting, within a predetermined range, upward movement of imaging module 14A configured the same as imaging module 14. Note that, the illustration of AF driving connector 71 provided to rigid FPC 70 of fixing part 11 (see FIG. 5) is omitted in FIG. 16. In addition, components of camera module 100B illustrated in FIG. 16 the same as components of camera module 100 are provided with the same reference signs, and descriptions for those components are omitted.

In addition, stacking cover member 116 includes an opening, which is not illustrated, from which imaging-module print wiring board 143 is drawn out, and imaging-module print wiring board 143 drawn out from this opening is covered by circuit board cover member 117.

Circuit board cover member 117 covers the opening, and also covers the bent portion of imaging-module print wiring board 143. With this configuration, the size of entire camera module 100A can be made smaller than that of camera module 100 according to Embodiment 1. To be more specific, stacking cover member 116 is provided on restriction portions 114d of skirt member 114, and only have to cover a portion of imaging module 14A protruding out of reception port 114a, and accordingly, the configuration of entire camera module 100A can be smaller than the configuration in which main body cover member 115 covering movable part 12 and skirt member 114 is used.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while the actuator of the embodiment is of a so-called moving magnet type in which fixing part 11 includes coil part 112 and movable part 12 includes magnet part 122, the present invention may be applied to an actuator of a so-called moving coil type in which a fixing part includes a magnet part and a movable part includes a coil part. In this case, a yoke is also disposed to the fixing part.

While, in the embodiment, two pairs of tilt coil 112A and permanent magnet 122A and tilt coil 112C and permanent magnet 122C are disposed as the voice coil motor that rotationally sways movable part 12 around the X axis, and two pairs of tilt coil 112B and permanent magnet 122B and tilt coil 112D and permanent magnet 122D are disposed as the voice coil motor that rotationally sways movable part 12 around the Y axis, it suffices that at least one pair is disposed as each of the voice coil motors.

Displacement detection part 40 is disposed on fixing part 11 in such a manner as to face the bottom surface of movable part 12. In this way, displacement detection part 40 enables shake correction while reducing an occupancy space as much as possible.

In addition, preferably, each component (in particular, magnet part 122) of OIS actuator A is formed of a highly heat-resistant material. This makes it possible to employ soldering of a reflow type for such components. In addition, as a countermeasure against noise, a conductive shield case may be provided on the outside of camera module 100.

Figure 17A:
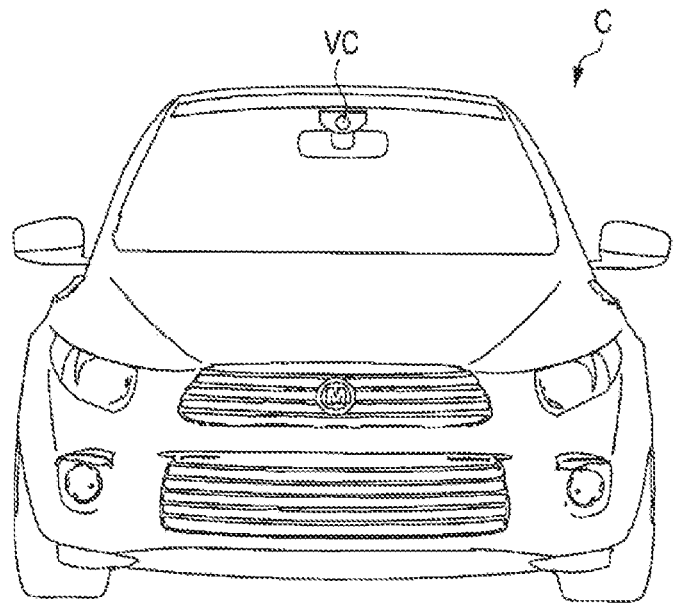
FIGS. 17A and 17B illustrate an automobile in which an onboard camera according to one embodiment of the invention is mounted.
Figure 17B:
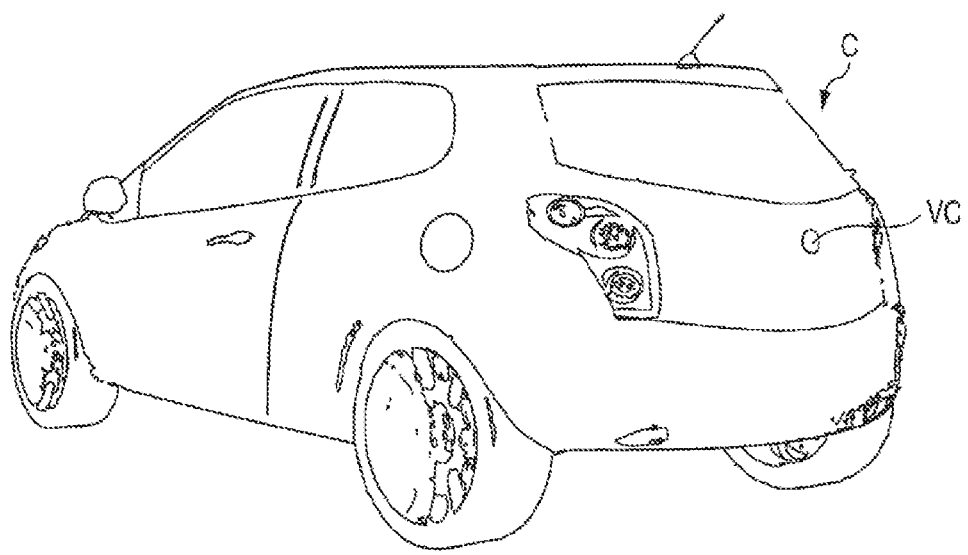

While a smartphone that is a camera-equipped mobile terminal is described in the embodiment as an example of the camera-mounted device having camera module 100, the present invention is also applicable to a camera-mounted device that is an information device or transporting device. For example, the present invention is also applicable to camera-equipped mobile phones, note-type personal computers, tablet terminals, mobile game machines, web cameras, and the like as a camera-mounted device. The present invention is also applicable to automobiles, camera-equipped onboard devices (for example, rear monitoring device or drive recorder), or the like as a camera-mounted device. FIGS. 17A and 17B illustrate vehicle C in which onboard camera module VC (Vehicle Camera) is mounted. FIG. 17A is a front view of vehicle C and FIG. 17B is a rear perspective view of vehicle C. Camera module 100 as described in the embodiment is mounted on vehicle C as onboard camera module VC, for example. Onboard camera module VC is used for rear monitoring, drive recording, collision avoidance control, automatic drive control, and the like.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

This application is entitled to and claims the benefits of Japanese Patent Application No. 2015-127686 dated Jun. 25, 2015 and Japanese Patent Application No. 2016-060058 dated Mar. 24, 2016, the disclosures of which each including the specification, drawings and abstract are incorporated herein by reference in their entirety.

REFERENCE SIGNS LIST

11 Fixing part
12 Movable part
13 Elastic supporting part (supporting part)
13a Center portion
13b Inner gimbal
13c Outer gimbal
14 Imaging module
15 Shake detection part
30 Intermediary substrate
40 Displacement detection part
40a, 40b Hall element
60 Driver IC
70, 70A Rigid FPC (main board)
70a, 70Aa Rigid portion
70b, 70Ab Flexible portion
80, 80A Coil board (flexible printed circuit)
81 Power supply pad
82, 82A, 83, 83A Connecting terminal (terminal part)
92, 93 Connecting terminal
100, 100A, 100B Camera module
111, 111A Base member
111a Protruding portion
112 Coil part
112A, 112B, 112C, 112D Tilt coils
114 Skirt member
114a Reception port
114d Restriction part
115, 115B Cover member
115a Opening
120 Yoke (holding member)
121 Yoke main body
121b Outside droop portion
121c Inside droop portion
1211a Module attachment portion
1211b Gimbal attachment portion
122 Magnet part
122A, 122B, 122C, 122D Permanent magnets
126 Module Guide
141 Lens part
142 AF actuator
VC Onboard camera module

The invention claimed is:

1. A lens driving device configured to correct shake by tilting an imaging module with a driving force of a voice coil motor including a coil part and a magnet part, the imaging module including a lens part and an imaging device, the lens driving device comprising:
a movable part including a frame-shaped holding member on which the imaging module is to be placed, wherein the magnet part is disposed to the frame-shaped holding member;
a fixing part including a base member, wherein the coil part is disposed to the base member;
a supporting part to be disposed to the base member, and configured to support the movable part such that the movable part is tiltable with respect to the fixing part; and
a main board including a circuit that enables shake correction by driving the voice coil motor by electric supply to the coil part, the fixing part being fixed to the main board, wherein:
the fixing part includes a coil board including a terminal part to which the coil part is connected, and
the coil part is configured to be connected to the circuit of the main board via the terminal part of the coil board.

2. The lens driving device according to claim 1, wherein: the coil board is a flexible printed circuit.

3. The lens driving device according to claim 1, wherein: the main board is a rigid-flexible printed wiring board.

4. The lens driving device according to claim 1, wherein: the coil part and the magnet part respectively include:

a first coil and a first magnet configured to move the movable part in a first direction orthogonal to an optical-axis direction of the lens part, and a second coil and a second magnet, respectively, configured to move the movable part in a second direction orthogonal to the optical-axis direction and to the first direction;

the fixing part includes first and second Hall elements configured to detect magnetic forces of the first and the second magnets, respectively;

the terminal part of the coil board is connected to the first and the second coils, and connected to the first and the second Hall elements; and the first and the second coils, and the first and the second Hall elements are connected to the circuit of the main board via the terminal part of the coil board.

5. The lens driving device according to claim 1, wherein:

the supporting part is an elastic supporting part configured to support the movable part such that the movable part is tiltable with respect to the fixing part by elastic deformation of the elastic supporting part; and the frame-shaped holding member includes:

a frame-shaped module attachment portion to which the imaging module is to be mounted, and a supporting-part attachment portion disposed at an inside of the frame-shaped module attachment portion, the supporting-part attachment portion including a stepped surface to which the supporting part is to be attached, the stepped surface being lower than the frame-shaped module attachment portion.

6. The lens driving device according to claim 1, wherein:

the coil board is disposed on the base member, and the terminal part of the coil board laterally extends out from the base member.

7. A camera module comprising:

the lens driving device according to claim 1;

the imaging module including the lens part and the imaging device, the imaging module being configured to be bonded to the frame-shaped holding member; and a shake detection part configured to detect shake of the imaging module.

8. The camera module according to claim 7, wherein:

the imaging module has an auto-focusing function.

9. A camera-mounted device that is an information device or a transporting device, the camera-mounted device comprising:

the camera module according to claim 7.

* * * * *